US011281507B2

(12) United States Patent
Ueno et al.

(10) Patent No.: US 11,281,507 B2
(45) Date of Patent: Mar. 22, 2022

(54) API SELECTION SYSTEM AND API SELECTION METHOD

(71) Applicant: Hitachi, Ltd., Tokyo (JP)

(72) Inventors: Rina Ueno, Tokyo (JP); Keisuke Hatasaki, Tokyo (JP); Hiroshi Nasu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/206,247

(22) Filed: Mar. 19, 2021

(65) Prior Publication Data

US 2022/0058064 A1 Feb. 24, 2022

(30) Foreign Application Priority Data

Aug. 24, 2020 (JP) ................ JP2020-141181

(51) Int. Cl.
*G06F 3/00* (2006.01)
*G06F 9/54* (2006.01)

(52) U.S. Cl.
CPC .................. *G06F 9/541* (2013.01)

(58) Field of Classification Search
CPC ...................................... G06F 9/541
USPC ....................................... 719/318
See application file for complete search history.

(56) References Cited

U.S. PATENT DOCUMENTS

| 5,359,572 | A | * | 10/1994 | Sato | .......... | G11C 8/10 |
| | | | | | | 365/230.03 |
| 2005/0114900 | A1 | * | 5/2005 | Ladd | .......... | H04N 21/818 |
| | | | | | | 725/100 |
| 2006/0015940 | A1 | * | 1/2006 | Zamir | .......... | G06F 21/563 |
| | | | | | | 726/22 |
| 2010/0050189 | A1 | * | 2/2010 | Sng | .......... | G06F 9/545 |
| | | | | | | 719/321 |
| 2012/0082306 | A1 | * | 4/2012 | Hulse | .......... | G06F 21/36 |
| | | | | | | 380/28 |
| 2013/0132584 | A1 | | 5/2013 | Palladino et al. | | |
| 2017/0371937 | A1 | * | 12/2017 | Shah | .......... | G06F 8/71 |
| 2019/0230081 | A1 | * | 7/2019 | Singh | .......... | G06F 9/547 |
| 2020/0326913 | A1 | * | 10/2020 | Ying | .......... | G06N 20/00 |

OTHER PUBLICATIONS

Matthew Horridge, The OWL API: A Java API for Working with OWL 2 Ontologies. (Year: 2009).*

(Continued)

*Primary Examiner* — Lechi Truong
(74) *Attorney, Agent, or Firm* — Mattingly & Malur, PC

(57) ABSTRACT

An API selection system that selects an API (Application Programming Interfaces) includes an API repository that accumulates an API in association with a functional requirement of the API, a save processing unit that receives, from an application developer, an input of an API request definition that defines the functional requirement and a non-functional requirement required for an API with which an application developed by the application developer is linked and saves the input in a storage unit, and a candidate API extraction processing unit that executes a candidate API extraction process of extracting, from the API repository, a plurality of candidate APIs having a functional requirement which matches or is similar to a functional requirement of the API request definition saved in the storage unit by the save processing unit.

5 Claims, 21 Drawing Sheets

(56) References Cited

OTHER PUBLICATIONS

Yong-Ju Lee, Semantic-Based Web API Composition for Data Mashups. (Year: 2010).*
"RapidAPI", [online], [searched on Jul. 2, 2020], Internet <URL: https://rapidapi.com/>.

* cited by examiner

FIG. 2

```
1.   apiVersion: v1
2.   kind: Endpoints
3.   metadata:
4.       name: test-service
5.   type: dynamic
6.   ---
7.   apiVersion: v1
8.   kind: DynamicAPI
9.   metadata:
10.      name: test-service
11.  spec:
12.      - repository: 'https://api.jp'
13.        description: dog counter
14.        input: image
15.        output: number
16.        success_rate: 0.8
17.        latency: 627ms
18.        release: canary
```

FIG. 3

| API REGISTRATION | | |
|---|---|---|
| 911 — API NAME | | TEXT |
| 912 — API DESCRIPTION | | TEXT |
| 913 — FIELD | ▶ | DROP-DOWN LIST |
| 914 — INPUT FORMAT | ▶ | DROP-DOWN LIST |
| 915 — OUTPUT FORMAT | ▶ | DROP-DOWN LIST |
| 916 — API SPECIFICATION DEFINITION FILE | REFERENCE... NO FILE IS SELECTED. | FILE UPLOAD |
| 917 — ... | ... | |

918a — SAVE   918b — CANCEL

| API SETTING CHANGE | | |
|---|---|---|
| 921 — API NAME | test-api | TEXT |
| 922 — API DESCRIPTION | The Computer Vision API provides state-of-the-art algorithms to process images and return information. | TEXT |
| 923 — FIELD | TEXT ANALYSIS ▶ | DROP-DOWN LIST |
| 924 — INPUT FORMAT | PDF ▶ | DROP-DOWN LIST |
| 925 — OUTPUT FORMAT | string ▶ | DROP-DOWN LIST |
| 926 — API SPECIFICATION DEFINITION FILE | REFERENCE... 📎 test-api.yaml ✕ | FILE UPLOAD |
| 927 — ... | | |

928a — SAVE    928b — CANCEL

929 — API DELETION

API REQUEST TABLE 122

| API REQUEST ID | LABEL | FUNCTIONAL REQUIREMENT | | | | NON-FUNCTIONAL REQUIREMENT | | | |
|---|---|---|---|---|---|---|---|---|---|
| | | INPUT FORMAT | OUTPUT FORMAT | KEYWORD | TEST DATA | SUCCESS RATE | DELAY | RELEASE METHOD |
| 1 | Animal counter | image | number | {dog, counter} | images /test1/ | 0.8 | 627ms | canary |
| ⋮ | ⋮ | ⋮ | ⋮ | ⋮ | ⋮ | ⋮ | ⋮ | ⋮ |
| 1221 | 1222 | 1223 | 1224 | 1225 | 1226 | 1227 | 1228 | 1229 |

FIG. 7

API TABLE 221

| API ID | API NAME | INPUT FORMAT | OUTPUT FORMAT | DESCRIPTION |
|---|---|---|---|---|
| 1 | character recognition | text | string | description1 |
| 2 | dog detection | image | number | description2 |
| ... | ... | ... | ... | ... |
| 2211 | 2212 | 2213 | 2214 | 2215 |

API SELECTION SYSTEM AND API SELECTION METHOD

CROSS-REFERENCE TO RELATED APPLICATION

The present application claims priority from Japanese application JP2020-141181, filed on Aug. 24, 2020, the contents of which is hereby incorporated by reference into this application.

BACKGROUND OF THE INVENTION

1. Field of the Invention

The present invention relates to an API selection system and an API selection method.

2. Description of the Related Art

In recent years, there has been a demand for rapid application development that meets the frequently changing customer needs. For this reason, it is important to have an application development method (continuous integration, continuous delivery) that continuously improves the application by repeating service repairs, specification changes, and releases in a short period of time.

In application development, a microservice architecture that loosely combines small services developed for each usage and purpose to form one application has become widespread. In microservice development using a microservice architecture, services can be combined and the functions of the services can be used by calling the services using APIs (Application Program Interface) provided by the services.

Since APIs are used in microservice development, the frequency and types of APIs that can be used are increasing. In microservice development, it is desirable to follow the frequent API addition and change cycles and quickly and continuously replace the APIs used by applications with more optimal ones.

With the increase in the frequency and types of APIs that can be used, the API marketplace is becoming more widespread. The API Marketplace is a service that provides convenient management functions to API developers and provides a wide variety of APIs to API users. The API marketplace can extract APIs that may have the functions and processes that users want by using a search method that uses abstract expressions such as keyword search.

CITATION LIST

Patent Literature

PTL 1: US 2013/132584 A

Non Patent Literature

NPL 1: "RapidAPI", [online], [searched on Jul. 2, 2020], Internet <URL: https://rapidapi.com/>

SUMMARY OF THE INVENTION

In developing an application (hereinafter, referred to as API-linked application) consisting of a combination of multiple service APIs (APIs provided by the service for the application to call the service), it is important to select an API to be applied to the API-linked application in order to improve the application to meet changing customer needs.

Therefore, in selecting an API to be applied to the API-linked application, application developers need to utilize the API marketplace to conduct more specific surveys on each selected API such as document confirmation and operation/performance tests.

In the future development of API-linked applications, which will speed up the development cycle such as changing or adding application specifications and APIs, it is expected that the man-hours required for manual work for API selection will be enormous. This is because it is difficult to associate various requirements such as non-functional requirements and test requirements with the API defined by the API developer for the API required by the application developer.

The invention has been made in view of the above problems, and an object of the invention is to facilitate the correspondence between the API required by the application developer and the API defined by the API developer.

In order to achieve the above object, an API (Application Programming Interfaces) selection system that selects an API in the invention includes an API repository that accumulates an API in association with a functional requirement of the API, a save processing unit that receives, from an application developer, an input of an API request definition that defines the functional requirement and a non-functional requirement required for an API with which an application developed by the application developer is linked and saves the input in a storage unit, and a candidate API extraction processing unit that executes a candidate API extraction process of extracting, from the API repository, a plurality of candidate APIs having a functional requirement which matches or is similar to a functional requirement of the API request definition saved in the storage unit by the save processing unit.

According to the invention, it is possible to facilitate the correspondence between the API required by an application developer and the API defined by an API developer.

BRIEF DESCRIPTION OF THE DRAWINGS

FIG. 2 is a diagram illustrating an example of the description contents of an API request definition in a manifest;

FIG. 3 is a diagram illustrating an example of an API registration screen GUI for registering an API in a dynamic API selection system;

FIG. 4 is a diagram illustrating an example of an API setting change screen GUI for executing setting change and deletion of an API registered in the dynamic API selection system;

FIG. 6 is a diagram illustrating an example of the configuration of an API request table of an application resource database;

FIG. 7 is a diagram illustrating an example of the configuration of an API table of an API repository;

DESCRIPTION OF THE PREFERRED EMBODIMENTS

Hereinafter, embodiments of the invention will be described with reference to the accompanying drawings. Further, the embodiments described below do not limit the scope of the invention. Not all the elements and combinations thereof described in the embodiments are essential to the solution of the invention. In addition, illustration and description may be omitted for well-known configurations that are essential for the configuration of the invention.

In the following description, the information obtained by obtaining the output for the input may be described by the expression "xxx table", but this information may be data having any structure. Therefore, the "xxx table" can be called "xxx information".

In addition, in the following description, the configuration of each table is given as merely exemplary. One table may be divided into two or more tables, or all or some of two or more tables may be configured by one table.

Further, in the following description, the process may be described with "program" as the subject. The program is performed by the processor unit, and a designated process is performed appropriately using a storage unit and/or an interface unit. Therefore, the subject of the process may be the processor unit (or a device such as a controller which includes the processor unit) or an xxx unit.

The program may be installed in a device such as a calculator, or may be, for example, a program distribution server or a (for example, non-temporary) recording medium which can be read by a calculator. In addition, in the following description, two or more programs may be expressed as one program, or one program may be expressed as two or more programs.

Further, the "processor unit" is one or more processors. The processor is typically a microprocessor such as a CPU (Central Processing Unit), or may be other types of processors such as a GPU (Graphics Processing Unit). The processor may be a single core or a multicore. The processor may be a processor such as a hardware circuit (for example, an FPGA (Field-Programmable Gate Array) or an ASIC (Application Specific Integrated Circuit)) which performs some or all of the processes in a broad sense.

In addition, in the following description, identification numbers are used as identification information of various types of targets. Identification information (for example, an identifier containing alphanumeric characters and symbols) other than the identification number may be employed.

In addition, in the following description, in a case where similar types of elements are described without distinction, the reference symbols (or common symbol among the reference symbols) may be used. In a case where the similar elements are described distinctively, the identification numbers (or the reference symbols) of the elements may be used. Further, the number of each element illustrated in each drawing is an example, and is not limited to the illustration.

Embodiments (1) Outline of Invention

Figure 1:
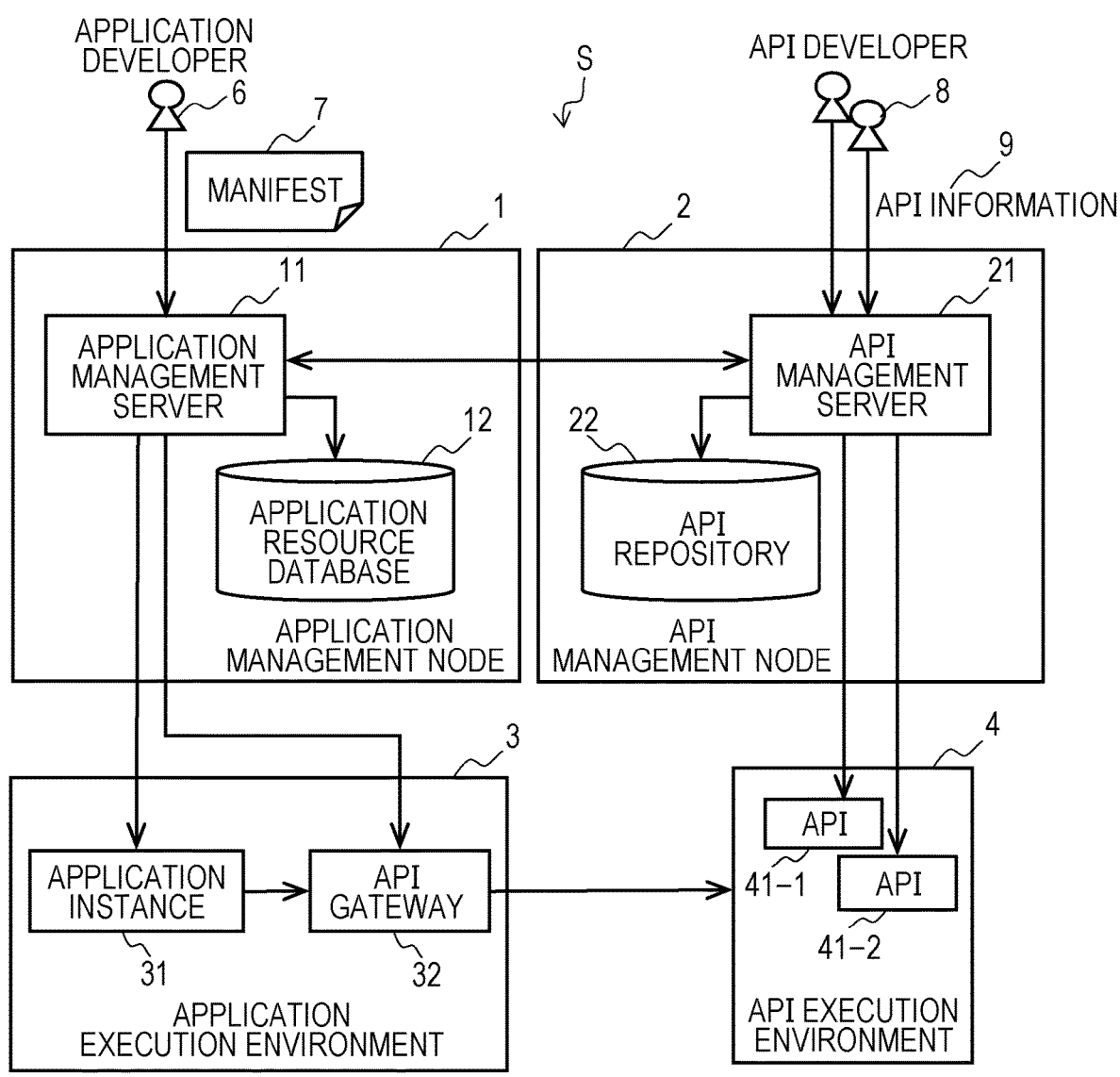
FIG. 1 is a diagram for explaining an outline of a dynamic API selection system according to an embodiment of the invention.

FIG. 1 is a diagram for explaining an outline of a dynamic API (Application Program Interface) selection system S according to the embodiment of the invention. The dynamic API selection system S dynamically selects an API based on an API request of an application developer 6 in the development of an API-linked application.

The dynamic API selection system S has an application management node 1 including an application management server 11 and an application resource database 12, and an API management node 2 including an API management server 21 and an API repository 22.

The dynamic API selection system S deploys and executes an application to an application execution environment 3 in cooperation with the application execution environment 3 including an application instance 31 and an API gateway 32 and an API execution environment 4 including one or more APIs 41.

In addition, the dynamic API selection system S monitors the application resource status and collects API information based on the API request, and dynamically executes API selection. The API request is described by the application developer 6 in an application resource configuration definition file (hereinafter, manifest 7). The manifest 7 describes resource definition information including an application resource configuration request (API request definition) related to APIs and an application resource configuration request (non-API request definition) related to other than APIs. The contents of the manifest 7 are input to the application management server 11 and accumulated in the application resource database 12.

API information 9 is input to the API management server 21 by an API developer 8 via an API registration screen GUI (Graphical User Interface) 91 (FIG. 3), and is accumulated in the API repository 22. The API information 9 is input to the API management server 21 by the API developer 8 via an API setting change screen GUI 92 (FIG. 4), and the API settings accumulated in the dynamic API selection system S are changed or an API is deleted.

FIG. 2 is a diagram illustrating an example of the description contents of an API request definition 71 in the manifest 7. The API request definition 71 is a requirement of an API required by the development application in the resource definition information, which is defined in the manifest 7 to be used when the dynamic API selection system S is used, in an API-linked application development. The description contents of the API request definition 71 are the setting of the endpoint (information such as URL (Uniform Resource Locator) indicating a storage location) of the API called by the application and the API request. In the case of FIG. 2, the endpoint settings are described in lines 1 to 5, and the API request is described in lines 7 to 18.

In the API request definition 71, the information described in the data item "kind" in line 2 represents the API attribute. The endpoint setting is mainly composed of the data item of "type" in line 5. The API request are mainly composed of data items of "repository" in line 12, "description" in line 13, "input" in line 14, "output" in line 15, "success_rate" in line 16, "latency" in line 17, and "release" in line 18.

The data items of the endpoint will be described. In the data item "type" in line 5, the method of specifying the endpoint of the API called by the application is specified. In the case of FIG. 2, since it is defined as "dynamic", the endpoint is dynamically specified according to API request definition 71, which indicates that the API is dynamically selected.

The data items of the API request will be described. In the data item "repository" in line 12, the URL of the server (API management server 21) that manages the API to be searched is set. In the data item "description" in line 13, a keyword used for word search of API is set. For example, words and related words that are expected to be included in the purpose of the service called by the API are set.

In the data item "input" in line 14, the format of the data to be input to the API is set. In the example of FIG. 2, the input data format is image. The format of the data output by the API is set in the data item "output" in line 15. In the example of FIG. 2, the output data format is numeric. In the data item "success_rate" in line 16, the target performance of the success rate for the API processing result is set. In the data item "latency" in line 17, the target performance value of a process delay time for the data given to the API is set. In the data item "release" in line 18, the algorithm and processing method used for deploying or releasing the API-linked application are set.

FIG. 3 is a diagram illustrating an example of the API registration screen GUI 91 for registering the API in the dynamic API selection system S. The API registration screen GUI 91 is a GUI for the API developer 8 to register an API developed by the API developer 8 in the dynamic API selection system S. As illustrated in FIG. 3, the API information 9 has input areas for items such as an API name 911, an API description 912, a field 913 where the API is used, an input format 914, an output format 915, and an API specification definition file 916.

The API name 911 and the API description 912 are entered as text. The field 913, the input format 914, and the output format 915 are entered by selection from a drop-down list. The API specification definition file 916 is input by uploading a file. The API specification definition file 916 is created in advance by the API developer 8 as a Swagger file or the like.

When a "Save 918a" button in the API registration screen GUI 91 is pressed, the API information 9 input via the API registration screen GUI 91 is saved in the dynamic API selection system S. On the other hand, when a "Cancel 918b" button in the screen GUI 91 is pressed, the API information 9 input via the API registration screen GUI 91 is discarded.

FIG. 4 is a diagram illustrating an example of the API setting change screen GUI 92 for executing the setting change and deletion of the API registered in the dynamic API selection system S. The API setting change screen GUI 92 is a GUI for the API developer 8 to operate the setting change or deletion of the API registered in the dynamic API selection system S. As illustrated in FIG. 4, the API setting change screen GUI 92 has the areas of items such as an API name 921, an API description 922, a field 923 where the API is used, an input format 924, an output format 925, and an API specification definition file 926. The items displayed on the API setting change screen GUI 92 are the same as those on the API registration screen GUI 91.

In the case of FIG. 4, the items that can be changed are the API description 922, the field 923, the input format 924, the output format 925, and the API specification definition file 926. In the API description 922, update information is entered in text. The field 923, the input format 924, the output format 925 are entered by selecting one of them from a drop-down list. The API specification definition file 926 is entered by uploading a file.

The API specification definition file 926 is created or edited in advance by the API developer 8 as a Swagger file or the like. When a "Save 928a" button in the API setting change screen GUI 92 is pressed, the change of the API information 9 input via the API setting change screen GUI 92 is saved and reflected in the dynamic API selection system S. On the other hand, when a "Cancel 928b" button in the screen GUI 92 is pressed, the change of the API information 9 input via the API setting change screen GUI 92 is discarded. When an "API deletion 929" button in the screen GUI 92 is pressed, the corresponding API information 9 is deleted from the dynamic API selection system S.

(2) System Configuration

Figure 5:
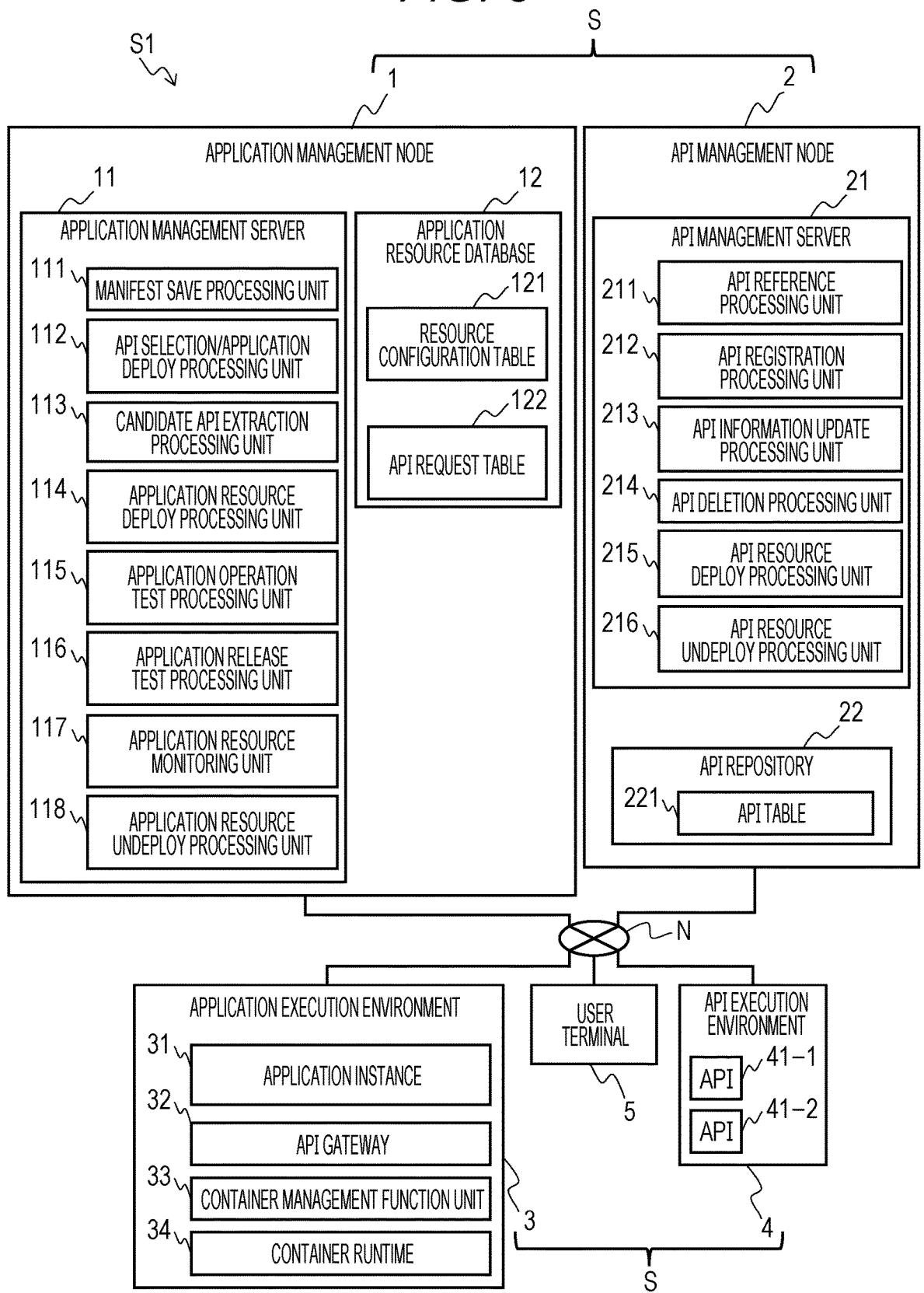
FIG. 5 is a block diagram illustrating an example of the configuration of a dynamic API selection system according to an embodiment of the invention.

FIG. 5 is a block diagram illustrating an example of the configuration of the dynamic API selection system according to the embodiment of the invention. The configuration of the entire system S1 including the dynamic API selection system S, the application execution environment 3, and the API execution environment 4 will be described with reference to FIG. 5. As illustrated in FIG. 5, the entire system S1 is configured by connecting the application management node 1, the API management node 2, the application execution environment 3, the API execution environment 4, and a user terminal 5 via a network switch N.

The dynamic API selection system S, the application execution environment 3, and the API execution environment 4 according to this embodiment are configured to include the application management node 1, the API management node 2, the application execution environment 3, and the API execution environment 4. However, the configuration may include the user terminal 5 as well.

The application management node 1 is a set of computers having the application management server 11 and the application resource database 12. The application management server 11 is a computer which executes each process such as the API selection, the application execution environment 3, and application resource management to be executed in the API execution environment 4 based on the manifest 7 received from the user terminal 5 and the instruction information to the application resources.

The application management server 11 includes a manifest save processing unit 111, an API selection/application deploy processing unit 112, a candidate API extraction processing unit 113, an application resource deploy processing unit 114, an application operation test processing unit 115, an application release test processing unit 116, and an application resource monitoring unit 117, and an application resource undeploy processing unit 118. A specific description of the processing of these processing units of the application management server 11 will be described later with reference to FIGS. 8 to 15.

The application resource database 12 is a persistent storage device having a resource configuration table 121 and an API request table 122. The application resource database 12 holds information on the configuration, settings, and requests of application resources for maintaining and sustaining the state of application resources executed in the application execution environment 3 and the API execution environment 4.

A specific example of the resource configuration table 121 of the application resource database 12 is etcd of Kubernetes, which is a key-value store with consistency and high availability, and is used as a data store for application resource information. A specific example of the API request table 122 of the application resource database 12 is illustrated in FIG. 6, and a specific description will be described later.

The API management node 2 is a set of computers having the API management server 21 and the API repository 22. The API management server 21 is a computer for the API developer 8 to execute processes such as API registration on the API repository 22, API information update, provision of the API registration screen GUI 91 and the API setting change screen GUI 92 for instructing API deletion, management of APIs in the API repository 22, and management of API resources executed in the API execution environment 4 based on the instruction information received from the application management node 1.

The API management server 21 has an API reference processing unit 211, an API registration processing unit 212, an API information update processing unit 213, an API deletion processing unit 214, an API resource deploy processing unit 215, and an API resource undeploy processing unit 216. A specific description of the processing of these processing units of the API management server 21 will be described later with reference to FIGS. 16 to 21.

The API repository 22 is a persistent storage device with an API table 221. A specific example of the API table 221 is illustrated in FIG. 7, and a specific description will be described later.

The application execution environment 3 is an environment in which programs for providing the application execution environment in this embodiment are prepared. The application execution environment 3 executes processing according to the instruction information of the application management server 11. The application execution environment 3 has the application instance 31 that is an entity of the application, the API gateway 32, a container management function unit 33 that executes and manages a container forming the application, and a container runtime 34 that generates or directly operates the container while using the function of a kernel or the like according to an instruction of the container management function unit 33.

The API execution environment 4 is an environment in which programs for providing the API execution environment 4 in this embodiment are prepared. The API execution environment 4 provides the API management server 21 with an environment for executing API resources according to the instruction information of the API management server 21. It is possible to deploy a plurality of API resources (API 41-1 and API 41-2 in FIG. 5) in the API execution environment 4.

The user terminal 5 is a computer operated by the API developer 8. The user terminal 5 displays the API registration screen GUI 91 and the API setting change screen GUI 92 provided by the API management server 21 on the connected display device, and accepts operations such as registration, reference, update, and deletion of the API information via these GUIs.

The network switch N is a network switch to which the application management server 11, the API management server 21, the application execution environment 3, the API execution environment 4, and the user terminal 5 are connected. Specifically, the network switch N may be, for example, a switch in a local network (for example, LAN (Local Area Network)).

FIG. 5 illustrates an example of the functional configuration of each node when the application management server 11, the API management server 21, the application execution environment 3, the API execution environment 4, and the user terminal 5 are each realized by a physical computer. However, these do not necessarily have to be realized entirely by a physical computer, and at least a part of them may be realized by replacing them with a virtual environment such as a virtual machine or a container.

(3) API Request Definition Information and Registration Information

The API request table 122 of the application resource database 12 and the API table 221 of the API repository 22 and their data will be described with reference to FIGS. 6 and 7.

FIG. 6 is a diagram illustrating an example of the configuration of the API request table included in the application resource database 12. The API request table 122 is a table for managing API requests (API request definition information) used by the API-linked application, and has an entry for each API used by the application.

In the case of FIG. 6, the API request table 122 is configured to include data items of an API request ID 1221, a label 1222, an input format 1223, an output format 1224, a keyword 1225, a test data 1226, a success rate 1227, a delay 1228, and a release method 1229.

The API request ID 1221 is an identifier of the request definition for one API (identifier generated by this system when a record is registered). The label 1222 is label information given to the application resource associated with the corresponding record (calling the API having the API request of the corresponding record).

The input format 1223 is a data format of data to be input to the API. The output format 1224 is a data format of data to be output by the API. The keyword 1225 is a list of words that are expected to be included in the description of API processing content stored in a description 2215 of the API table 221 of the API repository 22.

The input format 1223 is input from the data item "input" (line 14 in FIG. 2) of the manifest 7. The output format 1224 is input from the data item "output" (line 15 in FIG. 2) of the API request definition 71. The keyword 1225 is input from the data item "description" (line 13 in FIG. 2) of the API request definition 71.

The test data 1226 is an address in which a file of test data given to the API for operation verification and performance verification is stored. The success rate 1227 is a target performance value for the success rate for the results obtained in the operation verification and the performance verification. The delay 1228 stores the target performance value for the delay in API processing for the given data. The release method 1229 is information on the algorithm and processing contents used for deploying or releasing the API-linked application.

The test data 1226 is input from the data item "repository" (line 12 in FIG. 2) of the API request definition 71. The success rate 1227 is input from the data item "success_rate" (line 16 in FIG. 2) of the API request definition 71. The delay 1228 is input from the data item "latency" (line 17 in FIG. 2) of the API request definition 71. The release method 1229 is input from the data item "release" (line 18 in FIG. 2) of the API request definition 71.

In the case of FIG. 6, the input format 1223, the output format 1224, and the keyword 1225 are classified as API functional requirements, and the test data 1226, the success rate 1227, the delay 1228, and the release method 1229 are classified as non-functional requirements of the API.

FIG. 7 is a diagram illustrating an example of the configuration of the API table 221 included in the API repository 22. The API table 221 holds APIs developed by one or more API developers 8 and has an entry for each API. In the case of FIG. 7, the API table 221 is configured to include data items of an API ID 2211, an API name 2212, an input format 2213, an output format 2214, and the description 2215.

Each data item in the API table 221 will be described. The API ID 2211 is an API identifier. The API name 2212 is the name of the API. The input format 2213 is a request format for data to be input to the API. The output format 2214 is the format for data to be output by the API. The description 2215 describes the processing contents of the API.

(4) Processes Executed by the Dynamic API Selection System S

The processes executed by the dynamic API selection system S for the API-linked application according to this embodiment will be described. In the following description, it is assumed that the resource configuration of the entire system S1 is the resource configuration illustrated in FIG. 5.

The processes executed by the application management server 11 of the application management node 1 and the API management server 21 of the API management node 2 will be described with reference to FIGS. 8 to 21.

(4-1) Processes of Application Management Server 11

FIGS. 8 to 15 illustrate a flowchart of processing mainly executed by the application management server 11 of the application management node 1.

(4-1-1) Manifest Save Process

Figure 8:
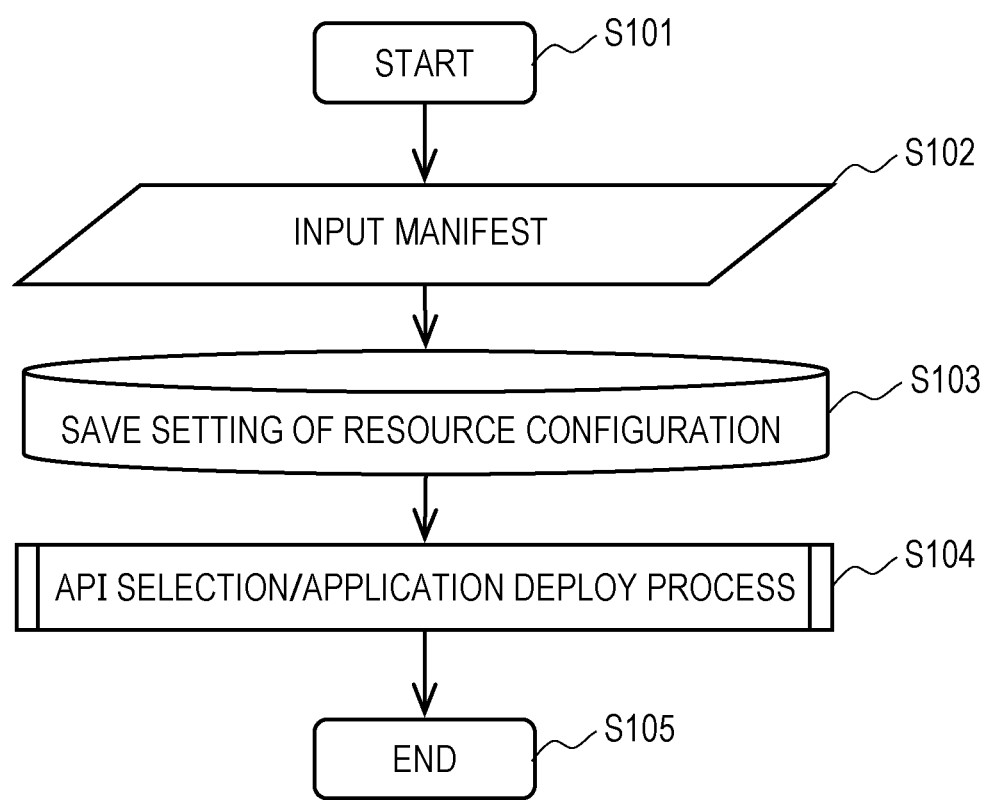
FIG. 8 is a flowchart illustrating an example of a processing procedure of manifest save process of an application management node.

FIG. 8 is a flowchart illustrating an example of the processing procedure of the manifest save process of the application management node 1. The manifest save processing unit 111 of the application management server 11 executes a process of receiving the application resource configuration definition file (manifest 7) which is input data, saving it in the database, and calling the API selection/application deploy process in which an API is selected based on the manifest 7 and the application is deployed.

The manifest save process is executed when the manifest 7 is input via the user terminal 5 and the creation of the application resource is instructed.

First, in Step S101, the manifest save processing unit 111 starts this process when the user terminal 5 executes a start command of the manifest save process.

Next, in Step S102, the manifest save processing unit 111 receives the manifest 7 input by the application developer 6 via the user terminal 5. Next, in Step S103, the manifest save processing unit 111 saves the resource configuration settings (resource definition information) in the application resource database 12. The resource definition information is information about application resources defined in the manifest 7. Specifically, the manifest save processing unit 111 writes the API request definition 71 of the resource definition information defined in the manifest 7 to the API request table 122, and writes information other than the API request to the resource configuration table 121.

Next, in Step S104, the manifest save processing unit 111 transmits the manifest 7 to the API selection/application deploy processing unit 112. The API selection/application deploy processing unit 112 executes the API selection/application deploy process based on the received manifest 7. Details of the API selection/application deploy process will be described later with reference to FIG. 9. In Step S105, the manifest save processing unit 111 ends the manifest save process.

(4-1-2) API Selection/Application Deploy Process

Figure 9:
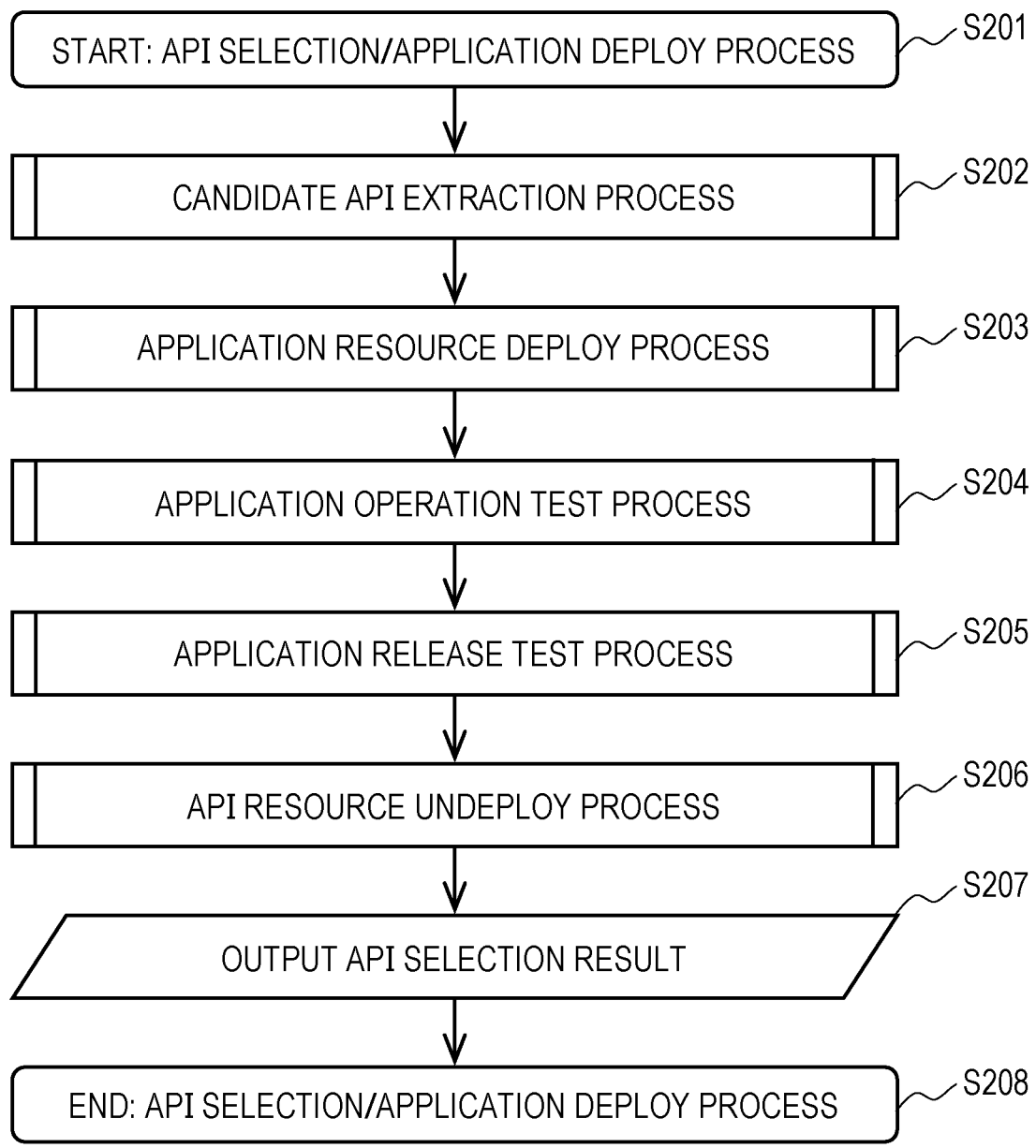
FIG. 9 is a flowchart illustrating an example of the processing procedure of an API selection/application deploy process of the application management node.

FIG. 9 is a flowchart illustrating an example of the processing procedure of the API selection/application deploy process of the application management node 1. The API selection/application deploy processing unit 112 is a process of dynamically selecting an API and deploying the application resource and the API resource based on the input manifest 7.

First, in Step S201, the API selection/application deploy processing unit 112 starts this process when it receives the start command of the API selection/application deploy process and the manifest 7.

Next, in Step S202, the API selection/application deploy processing unit 112 transmits the API request definition 71 defined in the manifest 7 to the candidate API extraction processing unit 113. Upon receiving the API request definition 71, the candidate API extraction processing unit 113 calculates a candidate API and executes the candidate API extraction process of creating a candidate API list. The details of the candidate API extraction process will be described later with reference to FIG. 10.

Next, in Step S203, the API selection/application deploy processing unit 112 transmits the manifest 7 and the candidate API list extracted in Step S202 to the application resource deploy processing unit 114. The application resource deploy processing unit 114 executes an application resource deploy process that deploys an application resource that satisfies the requirements of the manifest 7 in the application execution environment 3 and deploys the API resource listed in the candidate API list in the API execution environment 4. The details of the application resource deploy process will be described later with reference to FIG. 11.

Next, in Step S204, the API selection/application deploy processing unit 112 sends the information of the application resource deployed in the application resource deploy process (Step S203), the information of the API resource, the test data input by the application developer 6, and the candidate API list to the application operation test processing unit 115. The application operation test processing unit 115 executes the operation test of the APIs listed in the candidate API list, and executes the application operation test process of organizing the candidate API list by excluding the APIs that do not operate normally from the candidate API list. The details of the application operation test process will be described later with reference to FIG. 12.

Next, in Step S205, the API selection/application deploy processing unit 112 transmits the information of the application resource and the API resource tested in the application operation test process (Step S204) to the application release test processing unit 116. The application release test processing unit 116 controls to gradually increase the traffic to the evaluation target API based on the received application resource and API resource information, and finally executes the application release test process to uniquely determine the optimum API. The details of the application release test process will be described later with reference to FIG. 13. The application release test process continues to be executed using the execution environment used in the application operation test process.

Next, in Step S206, the API selection/application deploy processing unit 112 transmits the candidate API list extracted in the candidate API extraction process (Step S202) and the information of the unique API determined in the application release test process to the API resource undeploy processing unit 216. The API resource undeploy processing unit 216 executes the application resource undeploy process that deploys the API resource other than the unique API determined in the application release test process among the API resources deployed to the API execution environment 4 in the application resource deploy process. The details of the API resource undeploy process will be described later with reference to FIG. 21.

Next, in Step S207, the API selection/application deploy processing unit 112 transmits the information the unique API calculated in the application release test processing (Step S205) to the user terminal 5. In Step S208, the API selection/application deploy processing unit 112 ends the API selection/application deploy process.

(4-1-3) Candidate API Extraction Process

Figure 10:
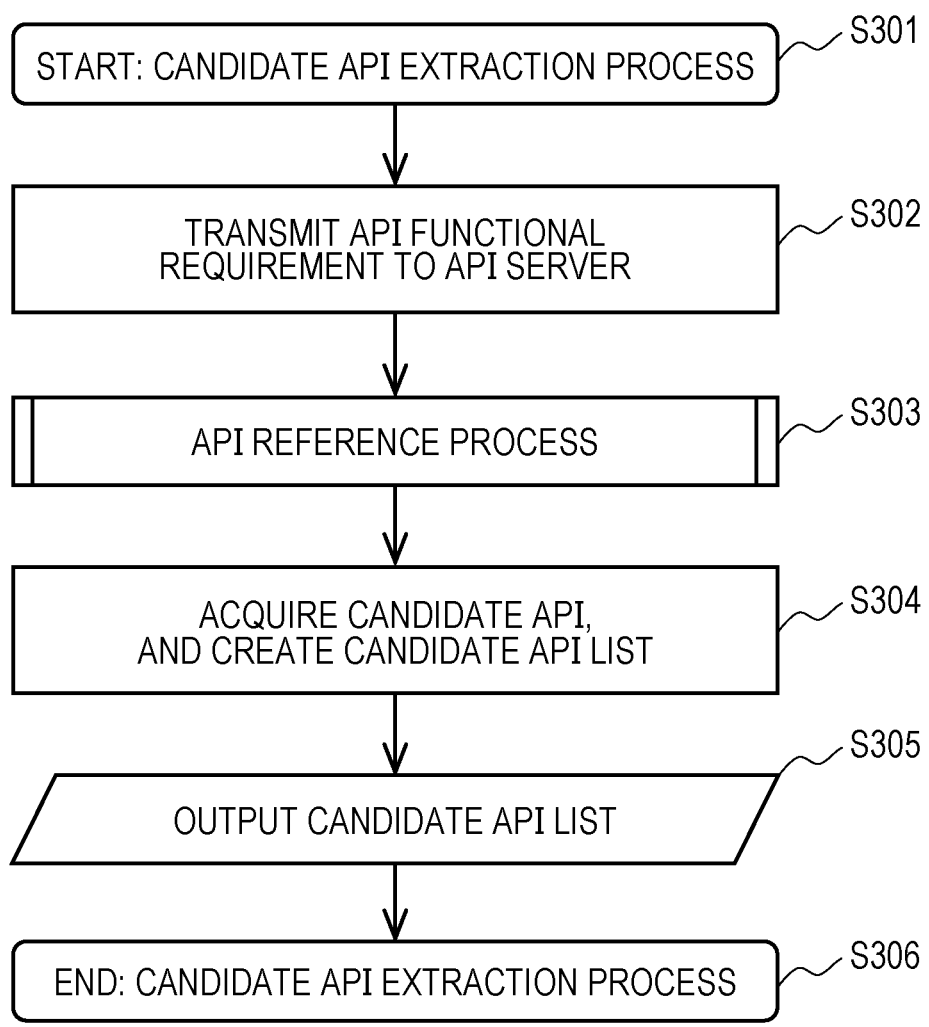
FIG. 10 is a flowchart illustrating an example of a processing procedure of a candidate API extraction process of the application management node.

FIG. 10 is a flowchart illustrating an example of the processing procedure of the candidate API extraction process of the application management node 1. The candidate API extraction process is executed when the application management server 11 receives the API request information. The candidate API extraction processing unit 113 is a process of extracting an API that meets the API functional requirements of the manifest 7 from the records in the API table 221 of the API repository 22.

First, in Step S301, the candidate API extraction processing unit 113 starts this process when it receives the API request information.

Next, in Step S302, the candidate API extraction processing unit 113 transmits an execution command of the API reference process to the API management server 21 together with information on functional requirements among the API requests in the manifest 7.

Next, in Step S303, when the API reference processing unit 211 of the API management server 21 extracts a record of the API that meets the API request of the manifest 7 from the API table 221 of the API repository 22 when receiving the execution command of the API reference process. Specifically, the API reference processing unit 211 compares the input format, output format, and keywords of the functional requirements of the API request with the input format, output format, and description of each record in the API table 221, and extracts a record of which the information is matched or similar as an API (candidate API) that meets the API request. Matching or similarity between the keyword and the description means that the description contains a word that matches the keyword or a synonym for the keyword. The API management server 21 transmits the information of the extracted candidate API to the application management server 11. The details of the API reference process of the API reference processing unit 211 will be described later with reference to FIG. 16.

Next, in Step S304, the candidate API extraction processing unit 113 creates a candidate API list based on the information of the candidate API received from the API reference processing unit 211. Next, in Step S305, the candidate API extraction processing unit 113 outputs the candidate API list. In Step S306, the candidate API extraction processing unit 113 ends the candidate API extraction process.

(4-1-4) Application Resource Deploy Process

Figure 11:
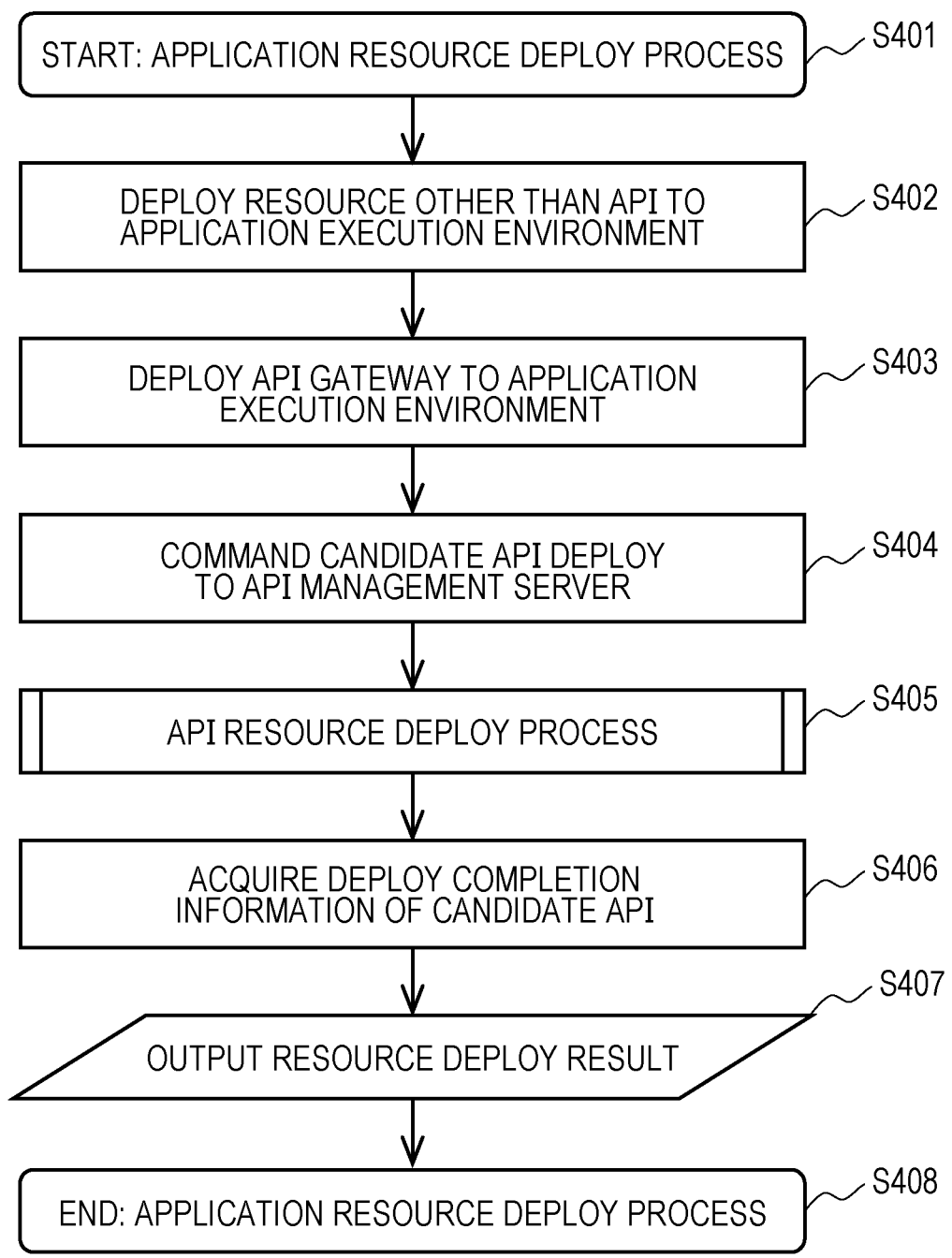
FIG. 11 is a flowchart illustrating an example of a processing procedure of an application resource deploy process of the application management node.

FIG. 11 is a flowchart illustrating an example of the processing procedure of the application resource deploy process of the application management node 1. The following process is executed when the application management server 11 receives the manifest 7 and the candidate API list. The application resource deploy process is a process of deploying the application resource defined in the manifest 7 and the API resource listed in the candidate API list to the application execution environment 3 or the API execution environment 4.

First, in Step S401, the application resource deploy processing unit 114 starts this process when it receives the manifest 7 and the candidate API list.

Next, in Step S402, the application resource deploy processing unit 114 deploys the application resources other than the API to the application execution environment 3 based on the manifest 7.

Next, in Step S403, the application resource deploy processing unit 114 deploys the API gateway 32 in the application execution environment 3. The API gateway 32 deployed in the application execution environment 3 is a computer that performs a process of linking the application resources deployed in the application execution environment 3 and the API resources deployed in the API execution environment 4 in a later process.

Next, in Step S404, the application resource deploy processing unit 114 transmits an execution command of the API resource deploy process for the API of the candidate API list together with the candidate API list to the API management server 21.

Next, in Step S405, the API resource deploy processing unit 215 of the API management server 21 performs the API resource deploy process of deploying the APIs listed in the candidate API list to the API execution environment 4 based on the received candidate API list. The details of the API resource deploy process will be described later with reference to FIG. 20. The API resource deploy processing unit 215 transmits deploy completion information to the application resource deploy processing unit 114 after the API resource deploy process is completed.

Next, in Step S406, the application resource deploy processing unit 114 receives the deploy completion information of the API listed in the candidate API list. Next, in Step S407, the application resource deploy processing unit 114 outputs the deploy result of the application resource. In Step S408, the application resource deploy processing unit 114 ends the application resource deploy process.

(4-1-5) Application Operation Test Process

Figure 12:
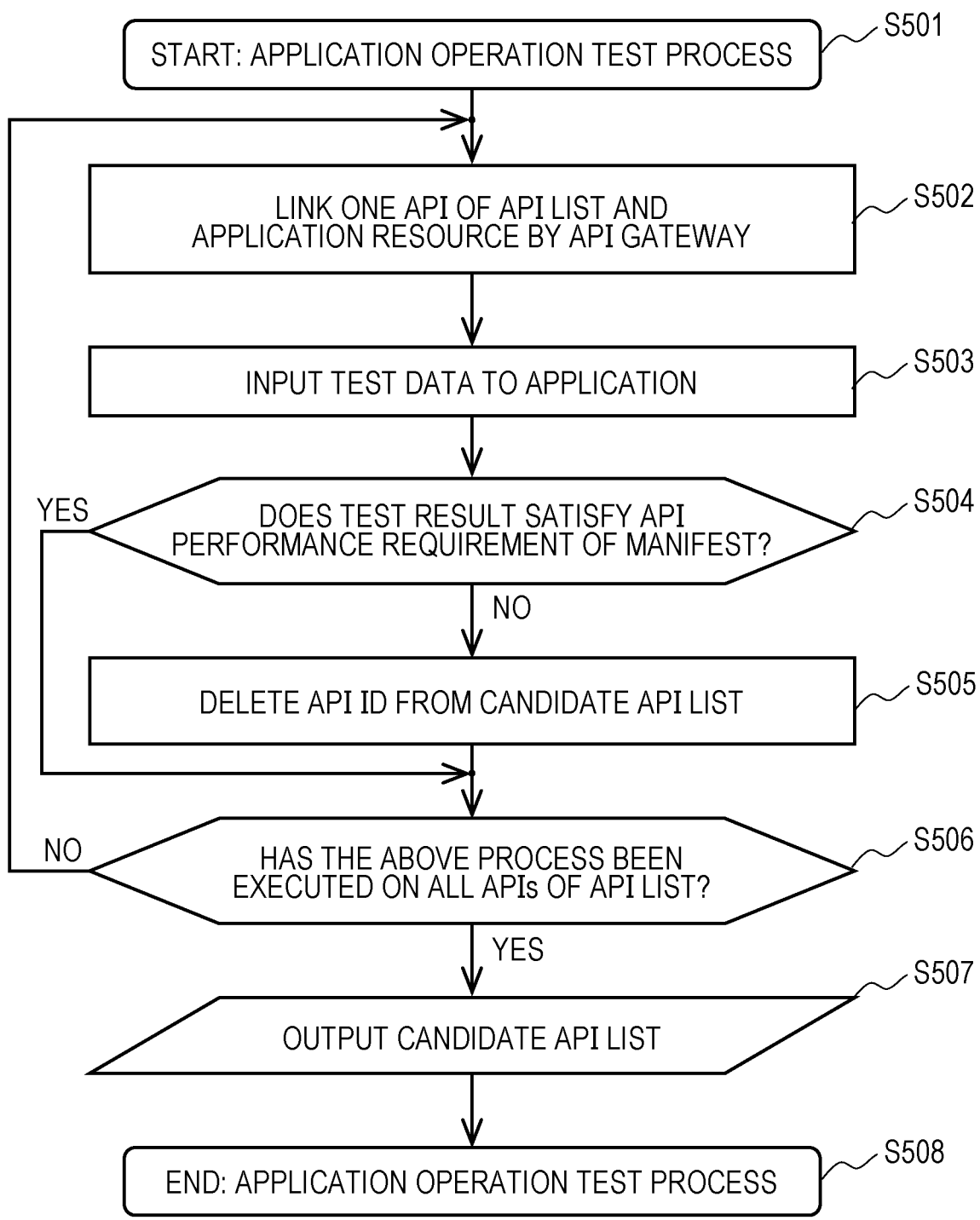
FIG. 12 is a flowchart illustrating an example of a processing procedure of an application operation test process of the application management node.

FIG. 12 is a flowchart illustrating an example of the processing procedure of the application operation test process of the application management node 1. The following process is executed when the application operation test processing unit 115 of the application management server 11 receives the deployed application resource and API resource information, the test data input by the application developer 6, and the candidate API list. The application operation test process is a verification process performed to confirm that the API deployed in the API execution environment 4 is operating normally without any error.

First, in Step S501, the application operation test processing unit 115 starts this process when it receives the deployed application resource and API resource information, the test data input by the application developer 6, and the candidate API list.

Next, in Step S502, the application operation test processing unit 115 transmits a link command between one unselected API among the APIs listed in the candidate API list and the application resource to the API gateway 32. The API gateway 32 executes the link process according to the link command between the received API and the application resource.

Next, in Step S503, the application operation test processing unit 115 transmits the test data to the application resource linked with the API in the link process.

Next, in Step S504, the application operation test processing unit 115 observes the performance such as the processing performance and the processing time of the application resource that has sent the test data, and confirms whether the observed value satisfies the API performance requirement of the manifest 7. The API performance requirements are the success rate 1227 and the delay 1228 among the non-functional requirements in the example of FIG. 6. The application operation test processing unit 115 shifts the process to Step S505 when the observed value does not meet the API performance requirement (Step S504, NO), but when the observed value meets the API performance requirement (Step S504, YES), the process proceeds to Step S506.

In Step S505, the application operation test processing unit 115 deletes the ID of the API determined not to satisfy the API performance requirement from the candidate API list. Next, in Step S506, the application operation test processing unit 115 confirms whether the processes of Steps S502 to S505 have been executed for all the APIs listed in the candidate API list. The application operation test processing unit 115 shifts the process to Step S507 when the processes of Steps S502 to S505 have been executed for all the APIs listed in the candidate API list (Step S506, YES), but if not (Step S506, NO), the process returns to Step S502.

In Step S507, the application operation test processing unit 115 outputs a candidate API list excluding APIs that do not satisfy the API performance requirements. Next, in Step S508, the application operation test processing unit 115 ends the application operation test process.

(4-1-6) Application Release Test Process

Figure 13:
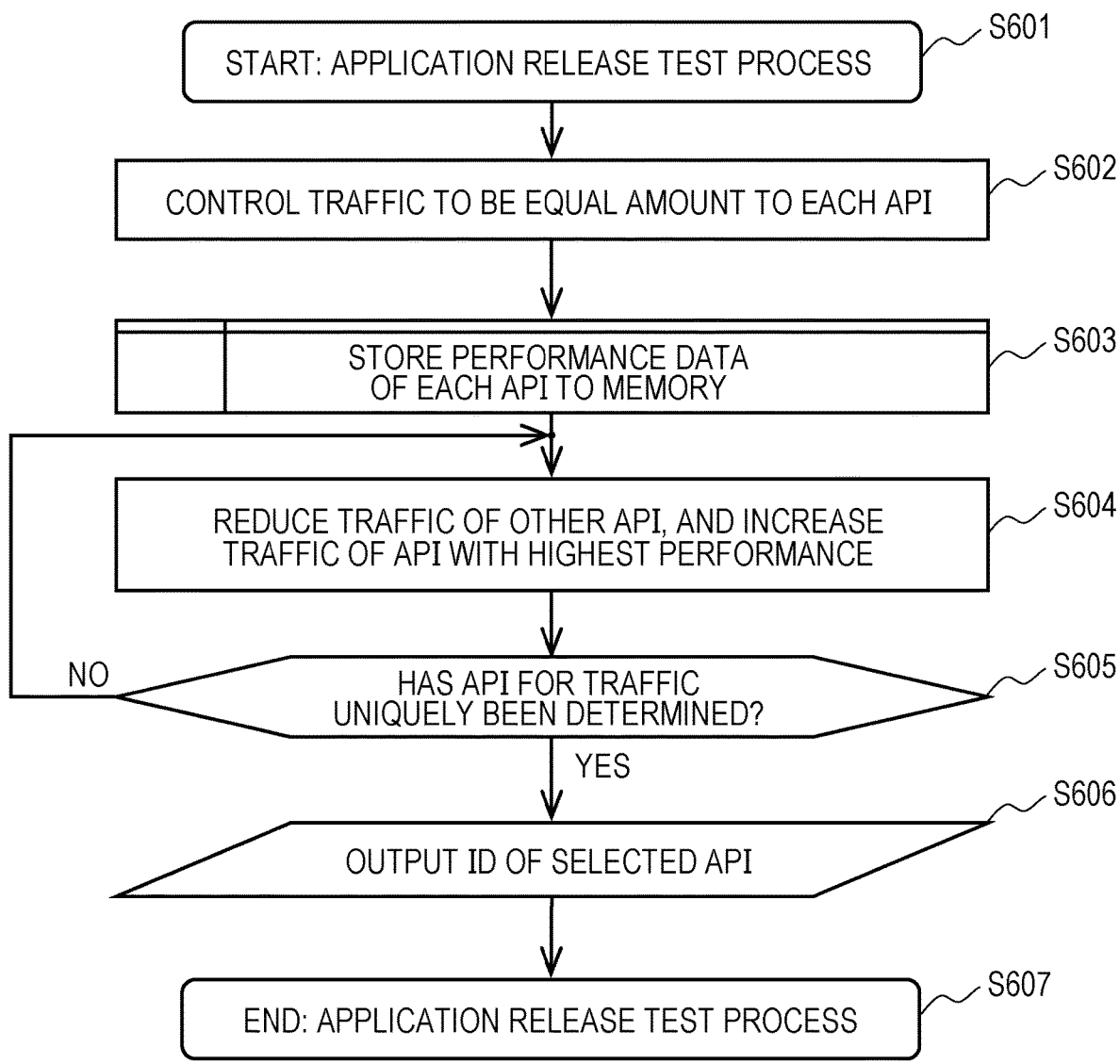
FIG. 13 is a flowchart illustrating an example of the processing procedure of an application release test process of the application management node.

FIG. 13 is a flowchart illustrating an example of the processing procedure of the application release test process of the application management node 1. The application release test process is executed when the application management server 11 receives the deployed application resource and API resource information and the candidate API list. Following the application operation test process, the application release test process is executed for the application deployed in the application execution environment 3 and the API that satisfies the API performance requirements deployed in the API execution environment 4.

The application release test processing unit 116 is a process for verification to finally determine a unique API which has the best performance, in which traffic is increased to all of the plurality of APIs connected to the application resources of the application execution environment 3 to measure the performance of the APIs, and the traffic is controlled to gradually increase for an API with the best measurement value. The performance referred to here is an index that can quantitatively measure the performance of the API linked with the application to be developed.

First, in Step S601, the application release test processing unit 116 of the application management server 11 starts this process when it receives the deployed application resource and API resource information and the candidate API list.

Next, in Step S602, the application release test processing unit 116 transmits a control command to the API gateway 32 of the application execution environment 3 to make a uniform amount of traffic for all the APIs linked to the application resource via the API gateway 32. For example, if n APIs are listed in the candidate API list, control is performed so that traffic is uniformly formed (100/n) % for each of the n APIs.

Next, in Step S603, the application release test processing unit 116 measures the performance of each API that has a uniform amount of traffic in Step S602, and saves the measured value in the memory.

Next, in Step S604, the application release test processing unit 116 compares each measurement value of the performance of the candidate API saved in the memory in Step S603, and transmits a control command to the API gateway 32 such that an API with higher performance has more traffic than the other APIs. For example, if the measured performance of an API (A), which is one of the n APIs listed in the candidate API list, is the best, the traffic in the (n−1) APIs other than the API (A) is reduced by α%, and the traffic in the API (A) is increased by (n−1)×α%.

Next, in Step S605, the application release test processing unit 116 confirms whether the API with the best performance has been uniquely determined. When an API has been uniquely determined, it means that the traffic increased from the API gateway 32 to one of the multiple APIs listed in the candidate API list has reached 100%. In other words, 100% of traffic is flowed from the API gateway 32 to one API. If the API has been uniquely determined (Step S605, YES), the process shifts to Step S606, but if the API has not been uniquely determined (Step S605, NO), the process returns to Step S604.

Next, in Step S606, the application release test processing unit 116 outputs the ID of the API uniquely determined in Step S605. In Step S607, the application release test processing unit 116 ends the application release test process.

(4-1-7) Application Resource Undeploy Process

Figure 14:
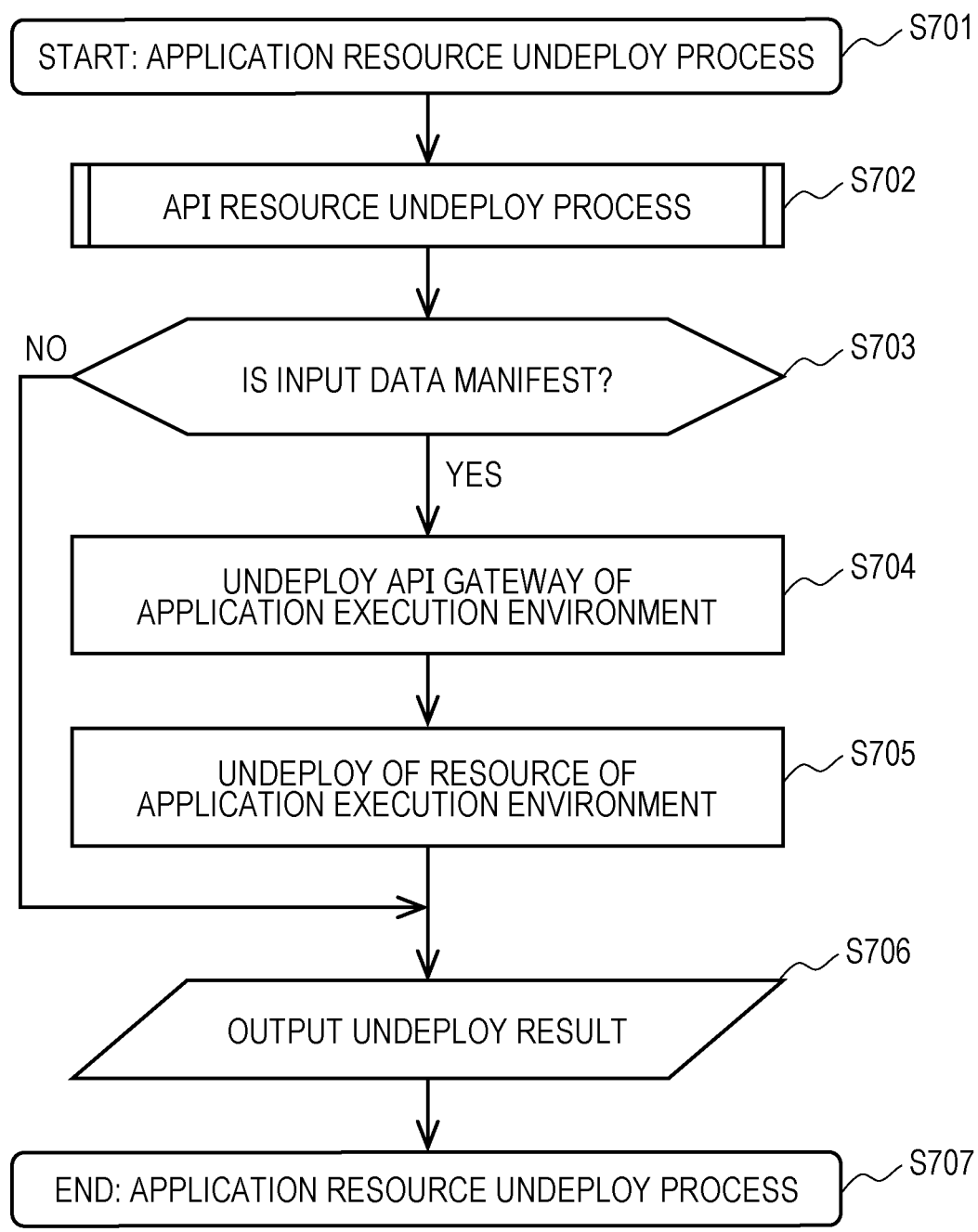
FIG. 14 is a flowchart illustrating an example of a processing procedure of an application resource undeploy process of the application management node.

FIG. 14 is a flowchart illustrating an example of the processing procedure of the application resource undeploy process of the application management node 1. The application resource undeploy process is executed when the application management server 11 receives the manifest 7 or the candidate API list. The application resource undeploy process is a process of undeploying the application resource defined in the manifest 7 or the API resource listed in the candidate API list from the application execution environment 3 or the API execution environment 4.

First, in Step S701, the application resource undeploy processing unit 118 of the application management server 11 starts this process when it receives the manifest 7 or the API list.

Next, in Step S702, the application resource undeploy processing unit 118 transmits an API resource undeploy command to the API resource undeploy processing unit 216 based on the received manifest 7 or the candidate API list. The API resource undeploy processing unit 216 executes the API resource undeploy process of undeploying the API deployed in the API execution environment 4. The details of the API resource undeploy process will be described later with reference to FIG. 21.

Next, in Step S703, the application resource undeploy processing unit 118 confirms whether the data input in Step S701 is the manifest 7. The application resource undeploy processing unit 118 shifts the process to Step S704 when the input data is the manifest 7 (Step S703, YES), but if the input data is the candidate API list (Step S703, NO), the process proceeds to Step S706.

Next, in Step S704, the application resource undeploy processing unit 118 undeploys the API gateway 32 on the application execution environment 3. Next, in Step S705, the application resource undeploy processing unit 118 undeploys the application resource on the application execution environment 3 based on the manifest 7 input in Step S701.

Next, in Step S706, the application resource undeploy processing unit 118 outputs the undeploy result to the user terminal 5. In Step S707, the application resource undeploy processing unit 118 ends the application resource undeploy process.

(4-1-8) Application Resource Monitoring Process

Figure 15:
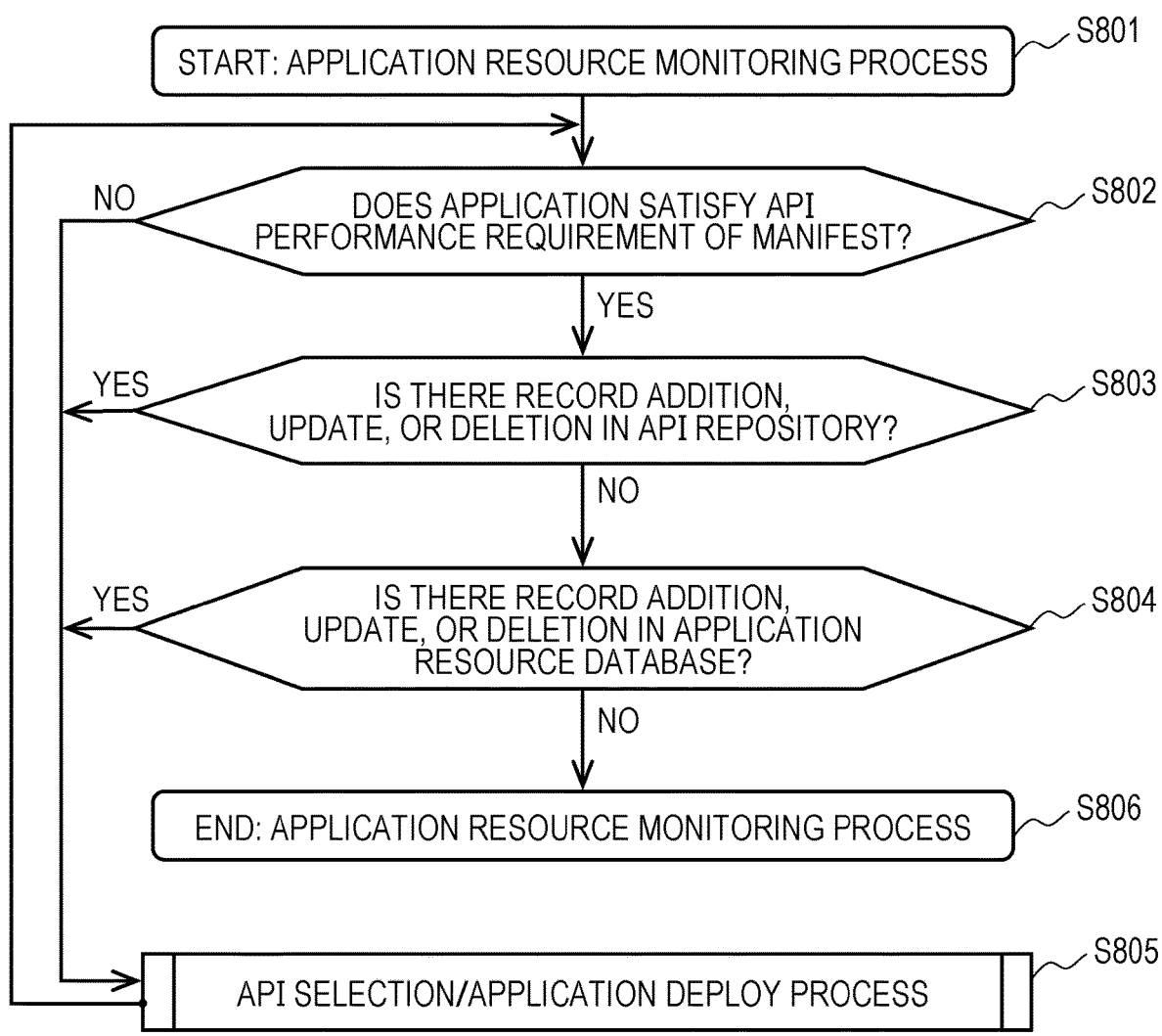
FIG. 15 is a flowchart illustrating an example of a processing procedure of application resource monitoring process of the application management node.

FIG. 15 is a flowchart illustrating an example of the processing procedure of the application resource monitoring process of the application management node 1. The application resource monitoring process is executed when the application management server 11 receives an application resource monitoring command. Application resource monitoring monitors the application status, the application resource database 12, and the API repository 22.

The application resource monitoring unit 117 executes the application resource monitoring process periodically (for example, once every 10 seconds). The application resource monitoring process periodically monitors the following conditions (a), (b), and (c), and when it is detected that any of the conditions is met, the API selection/application deploy processing unit 112 executes the API selection/application deploy process.

(a) The observed performance of the application deployed on the application execution environment 3 no longer meets the API performance requirements of the manifest 7.

(b) A record has been newly registered, updated with information, or deleted in API table 221 of the API repository 22 (new registration, update, and deletion of API).

(c) A record has been newly registered, updated with information, or deleted in the API request table 122 of the application resource database 12 (new registration, update, and deletion of API request).

First, in Step S801, the application resource monitoring unit 117 starts this process when it receives the application resource monitoring command.

Next, in Step S802, the application resource monitoring unit 117 acquires information such as the operating status of the application resource in the application execution environment 3, and confirms whether there is an abnormality in the application status and the application performance meets the API performance requirements of the manifest 7.

The application resource monitoring unit 117 shifts the process to Step S803 when there is no abnormality in the application status and the application performance meets the API performance requirements of the manifest 7 (Step S802, YES). On the other hand, the application resource monitoring unit 117 shifts the process to Step S805 when the application status is abnormal or the application performance does not meet the API performance requirements of the manifest 7 (Step S802, NO).

In Step S803, the application resource monitoring unit 117 confirms whether a record has been added, updated, or deleted in the API table 221 of the API repository 22 via the API management server 21.

Specifically, the application resource monitoring unit 117 transmits a request command for the status information of the API repository 22 to the API management server 21. When the API management server 21 receives the request command for the status information of the API repository 22, it uses the API reference processing unit 211 to check whether a record is added, updated, or deleted in the API table 221 of the API repository 22, and transmits the result to the application resource monitoring unit 117.

The application resource monitoring unit 117 receives the confirmation result of whether a record is added, updated, or deleted in the API table 221 of the API repository 22, and executes the next process according to the confirmation result. That is, the application resource monitoring unit 117 shifts the process to Step S804 when there is no addition, update, or deletion of a record in the API table 221 of the API repository 22 (Step S803, NO). On the other hand, the application resource monitoring unit 117 shifts the process to Step S805 when there is an addition, update, or deletion of a record in the API table 221 of the API repository 22 (Step S803, YES).

In Step S804, the application resource monitoring unit 117 confirms whether a record is added, updated, or deleted in the resource configuration table 121 and the API request table 122 of the application resource database 12. The application resource monitoring unit 117 shifts the process to Step S806 when there is no addition, update, or deletion of a record in the resource configuration table 121 and the API request table 122 of the application resource database 12 (Step S804, NO). On the other hand, the application resource monitoring unit 117 shifts the process to Step S805 when there is an addition, update, or deletion of a record in the resource configuration table 121 and the API request table 122 of the application resource database 12 (Step S804, YES).

In Step S805, the application resource monitoring unit 117 transmits a start command of the API selection/application deploy process and the manifest 7 of the resource corresponding to the case determined as NO in any of Steps S802 to S804 to the API selection/application deploy processing unit 112. When the API selection/application deploy processing unit 112 receives the start command of the API selection/application deploy process and the manifest 7 of the corresponding resource, the API selection/application deploy process described with reference to FIG. 9 is executed.

After the completion of Step S805, the application resource monitoring unit 117 returns the process to Step S802 and repeats each step. In Step S806, the application resource monitoring unit 117 ends the application resource monitoring process.

The application resource monitoring process is performed regularly by the above-mentioned application resource monitoring process, and the API linked with the application is re-selected to the API with higher satisfaction to similarity and performance requirements, so that a continuous improvement of the application performance can be expected.

(4-2) Processing of API Management Server 21

FIGS. 16 to 21 are flowcharts of the processes executed by the API management server 21 of the API management node 2.

(4-2-1) API Reference Process

Figure 16:
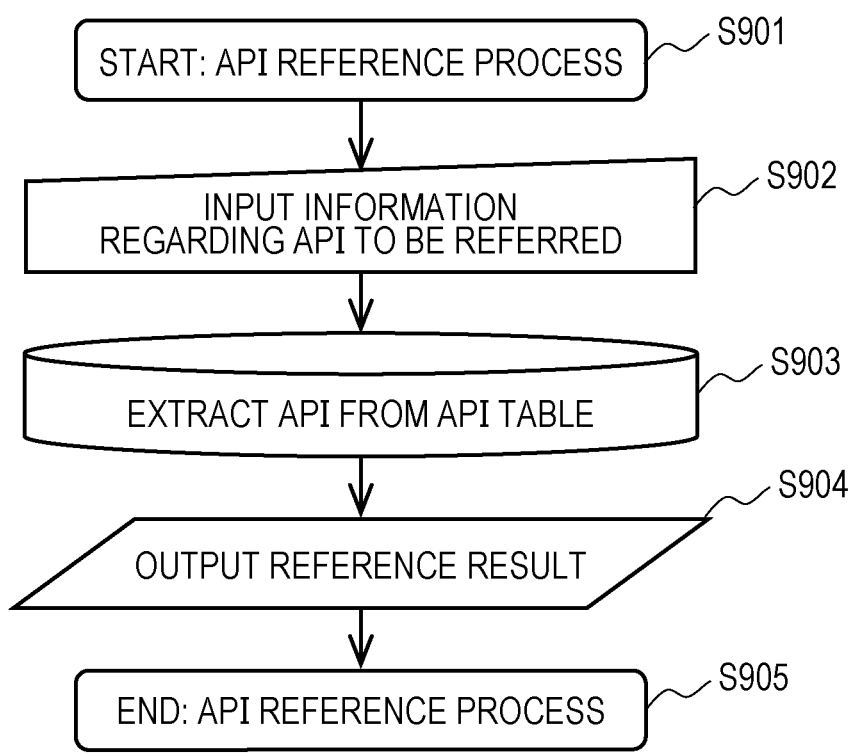
FIG. 16 is a flowchart illustrating an example of a processing procedure of an API reference process of the API management node.

FIG. 16 is a flowchart illustrating an example of the processing procedure of the API reference process of the API management node 2. The API reference process is the process of Step S303 in FIG. 10, and is executed when the API reference processing unit 211 of the API management server 21 receives an API reference request. The API reference process is a process of providing the record of the API table 221 of the API repository 22 to the transmission source of the API reference request.

First, in Step S901, the API reference processing unit 211 of the API management server 21 starts this process when it receives the API reference request.

Next, in Step S902, the API reference processing unit 211 accepts the input of information (API-related information) regarding the target API of the reference request input from the processing request source. Next, in Step S903, the API reference processing unit 211 creates a statement using the API-related information received in Step S902, and extracts an API that meets the condition from the API table 221 of the API repository 22 using this statement.

Next, in Step S904, the API reference processing unit 211 transmits information about the API extracted in the process of Step S903 to the request destination of the API reference. In Step S905, the API reference processing unit 211 ends the API reference process.

(4-2-2) API Registration Process

Figure 17:
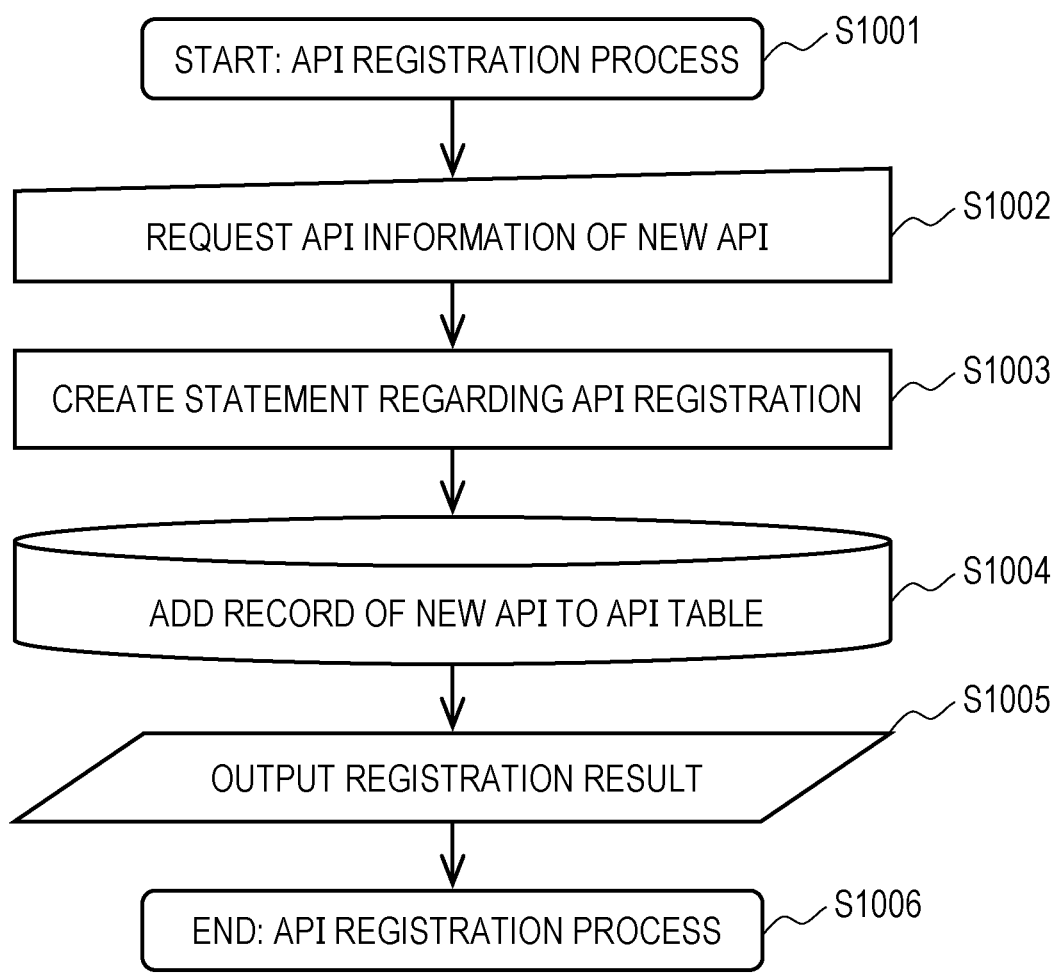
FIG. 17 is a flowchart illustrating an example of a processing procedure of an API registration process of the API management node.

FIG. 17 is a flowchart illustrating an example of the processing procedure of the API registration process of the API management node 2. The API registration process is executed when the API registration processing unit 212 of the API management server 21 receives an API registration request. The API registration process is a process of registering a new record in the API table 221 of the API repository 22 based on the information input via the API registration screen GUI 91 (FIG. 3).

First, in Step S1001, the API registration processing unit 212 starts this process when it receives the API registration request. Next, in Step S1002, the API registration processing unit 212 accepts the input of the API information 9 of the new API input from the request source via the API registration screen GUI 91.

Next, in Step S1003, the API registration processing unit 212 creates a statement for adding a new record to the API table 221 of the API repository 22 using the API information 9 input received in Step S1002. Next, in Step S1004, the API registration processing unit 212 adds a new record to the API table 221 of the API repository 22 using the statement created in Step S1003.

Next, in Step S1005, the API registration processing unit 212 transmits information regarding the processing result of the API registration to the request source of the API registration process. In Step S1006, the API registration processing unit 212 ends the API reference process.

(4-2-3) API Information Update Process

Figure 18:
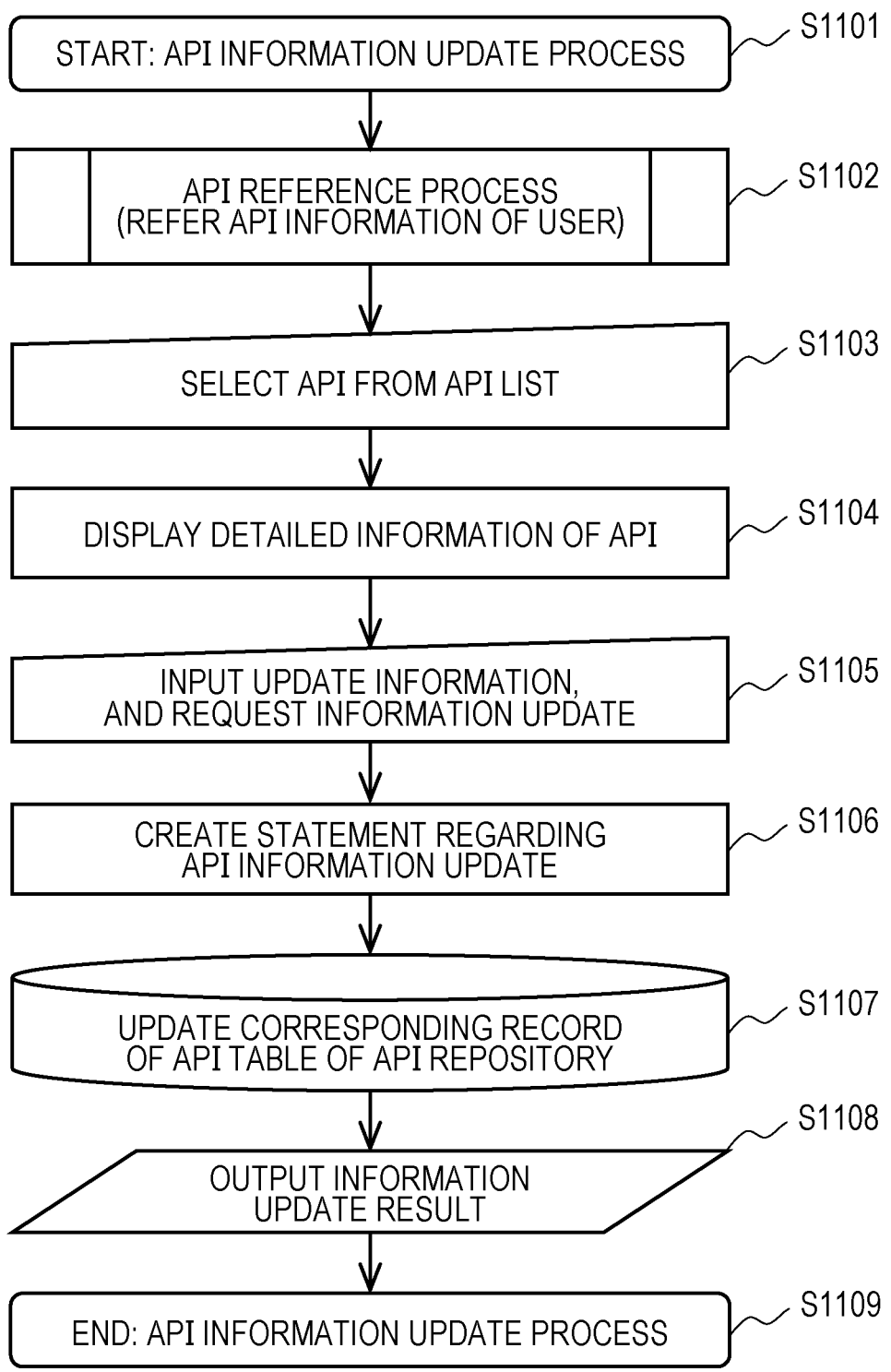
FIG. 18 is a flowchart illustrating an example of a processing procedure of an API information update process of the API management node.

FIG. 18 is a flowchart illustrating an example of the processing procedure of the API information update process of the API management node 2. The API information update process is executed when the API information update processing unit 213 of the API management server 21 receives the API reference request. The API information update process is a process of updating the record information existing in the API table 221 of the API repository 22 based on the information input via the API setting change screen GUI 92 (FIG. 4).

First, in Step S1101, the API information update processing unit 213 starts the API information update process when the API reference request is received.

Next, in Step S1102, the API information update processing unit 213 transmits the API reference request to the API reference processing unit 211 to call the API reference process (FIG. 16) in response to the operation of the user terminal 5 by the user. Then, the API information update processing unit 213 inputs the ID of the corresponding user as API-related information into the API reference process, and acquires the list information of the API managed by the corresponding user.

Next, in Step S1103, the API information update processing unit 213 accepts the selection of the API to be updated by the corresponding user using the user terminal 5. Next, in Step S1104, the API information update processing unit 213 displays the API detailed information of the corresponding API on the API setting change screen GUI 92 using the API information 9 acquired for the API selected by the process of Step S1103.

Next, in Step S1105, the user terminal 5 accepts a change in the API detailed information on the API setting change screen GUI 92 displayed on the display unit, generates an information update request regarding the corresponding API using the API detailed information and the API update information, and transmits the information update request to the API information update processing unit 213.

Next, in Step S1106, the API information update processing unit 213 receives the information update request and creates a statement for updating the API information using the API detailed information and the API update information. Next, in Step S1107, the API information update processing unit 213 updates the corresponding record information in the API table 221 of the API repository 22 using the statement created in Step S1106.

Next, in Step S1108, the API information update processing unit 213 transmits information regarding the API information update result to the request source of the API information update process. In Step S1109, the API information update processing unit 213 ends the API information update process.

(4-2-4) API Deletion Process

Figure 19:
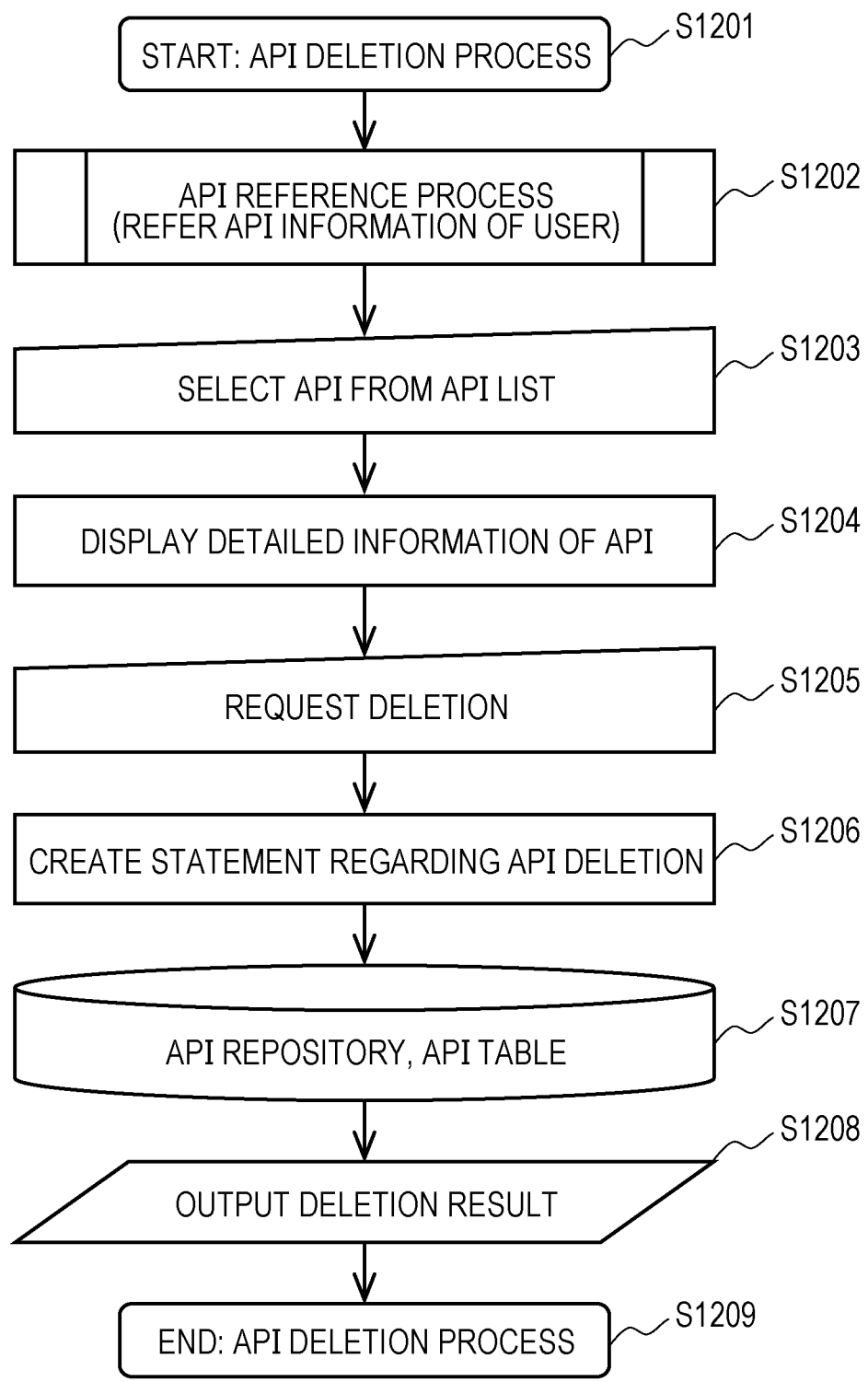
FIG. 19 is a flowchart illustrating an example of a processing procedure of an API deletion process of the API management node.

FIG. 19 is a flowchart illustrating an example of the processing procedure of the API deletion process of the API management node 2. The following processing is executed when the API management server 21 receives the API reference request. The API deletion process is a process of deleting a record existing in API table 221 of the API repository 22 based on the information input via the API setting change screen GUI 92 (FIG. 4).

First, in Step S1201, the API deletion processing unit 214 of the API management server 21 starts the API deletion process when the API reference request is received.

Next, in Step S1202, the API deletion processing unit 214 transmits the API reference request to the API reference processing unit 211 to call the API reference process (FIG. 16) in response to the operation of the user terminal 5 by the user. Then, the API deletion processing unit 214 inputs the ID of the corresponding user as API-related information into the API reference process, and acquires the list information of the API managed by the corresponding user.

Next, in Step S1203, the API deletion processing unit 214 accepts the selection of the API to be deleted by the corresponding user using the user terminal 5. Next, in Step S1204, the API deletion processing unit 214 displays the API detailed information of the corresponding API on the API setting change screen GUI 92 using the API information 9 acquired for the API selected by the process of Step S1203.

Next, in Step S1205, the user terminal 5 receives an API deletion instruction on the API setting change screen GUI 92 displayed on the display unit, and transmits an API deletion request to the API deletion processing unit 214. Next, in Step S1206, the API deletion processing unit 214 receives the API deletion request and creates a statement for deleting the API information using the API detailed information.

Next, in Step S1207, the API deletion processing unit 214 deletes the corresponding record information in the API table 221 of the API repository 22 using the statement created in Step S1206. Next, in Step S1208, the API deletion processing unit 214 transmits information regarding the API deletion result to the request source of the API deletion process. In Step S1209, the API deletion processing unit 214 ends the API deletion process.

(4-2-5) API Resource Deploy Process

Figure 20:
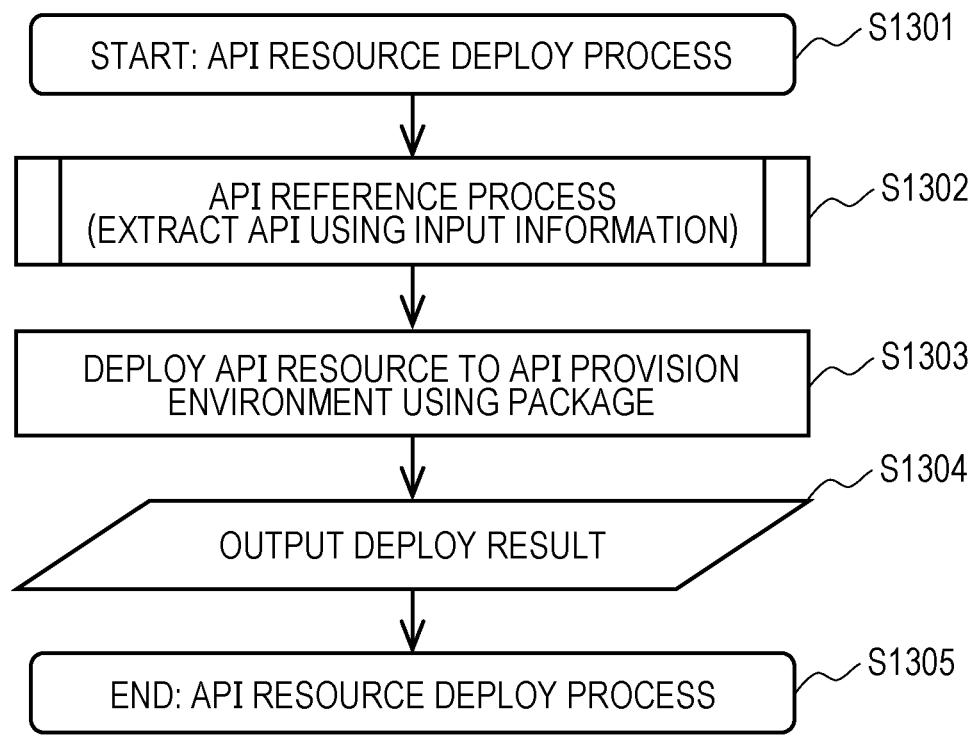
FIG. 20 is a flowchart illustrating an example of a processing procedure of an API resource deploy process of the API management node.

FIG. 20 is a flowchart illustrating an example of the processing procedure of the API resource deploy process of the API management node 2. The API resource deploy process is executed when the API management server 21 receives an API resource deploy request. The API resource deploy process is a process in which the appropriate API is referenced from the API table 221 of the API repository 22 based on the input information, and the API resource is deployed to the API execution environment 4 using a package of information regarding the API including data such as an API specification definition file.

First, in Step S1301, the API resource deploy processing unit 215 of the API management server 21 starts the API resource deploy process when it receives the API resource deploy request.

Next, in Step S1302, the API resource deploy processing unit 215 transmits the API reference request to the API reference processing unit 211 to call the API reference process (FIG. 16), searches the API table 221 using the information contained in the API resource deploy request, and acquires an appropriate API package.

Next, in Step S1303, the API resource deploy processing unit 215 deploys the API in the API execution environment 4 using the package acquired in Step S1302. Next, in Step S1304, the API resource deploy processing unit 215 transmits the information regarding the API resource deploy result to the request source of the API resource deploy process. In Step S1305, the API resource deploy processing unit 215 ends the API resource deploy process.

(4-2-6) API Resource Undeploy Process

Figure 21:
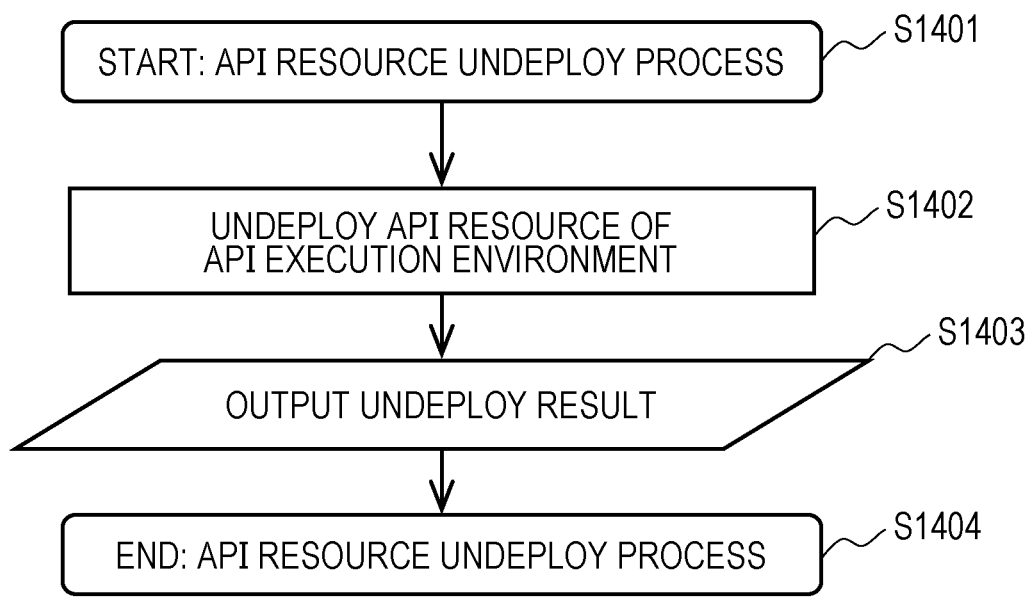
FIG. 21 is a flowchart illustrating an example of a processing procedure of an API resource undeploy process of the API management node.

FIG. 21 is a flowchart illustrating an example of the processing procedure of the API resource undeploy process of the API management node 2. The API resource undeploy process is executed when the API resource undeploy processing unit 216 of the API management server 21 receives an API resource undeploy request. The API resource undeploy process is a process of undeploying the target API resource from the API execution environment 4 based on the information input to the API resource undeploy processing unit 216.

First, in Step S1401, the API resource undeploy processing unit 216 starts the API resource undeploy process when the API resource undeploy request is received.

Next, in Step S1402, the API resource undeploy processing unit 216 undeploys the target API resource existing in the API execution environment 4 using the information included in the API resource undeploy request. Next, in Step S1403, the API resource undeploy processing unit 216 transmits the information on the API undeploy result to the request source of the API resource undeploy process. In Step S1404, the API resource undeploy processing unit 216 ends the API resource undeploy process.

In the above embodiment, in the development of an API-linked application, when another application (API) from the application is called, it is supported to select the most suitable application according to the request of the developer of the calling application. Therefore, the API performance requirements required by the application developer and the API defined by the API developer are associated with the functional requirements of the API request table 122 and the contents described in the API table 221.

Then, in this embodiment, specification confirmation (for example, candidate API extraction process) and test (application operation test, application release test, etc.) are automatically executed for various APIs, and an API that matches the requirements of the application developer is selected, so that a dynamic API selection system that speeds up API selection is realized.

Therefore, according to this embodiment, the API used by the application can be dynamically and continuously changed according to the addition or update of the API request table 122 and the API table 221. As a result, application operation test and application release test are seamlessly performed in the same environment so as to continuously respond to rapidly changing customer demands while following the cycle of new API provision, repair, specification change, etc., so that the optimum API is quickly selected. Then, the burden on the application developer can be reduced and the development efficiency can be improved.

Figure 22:
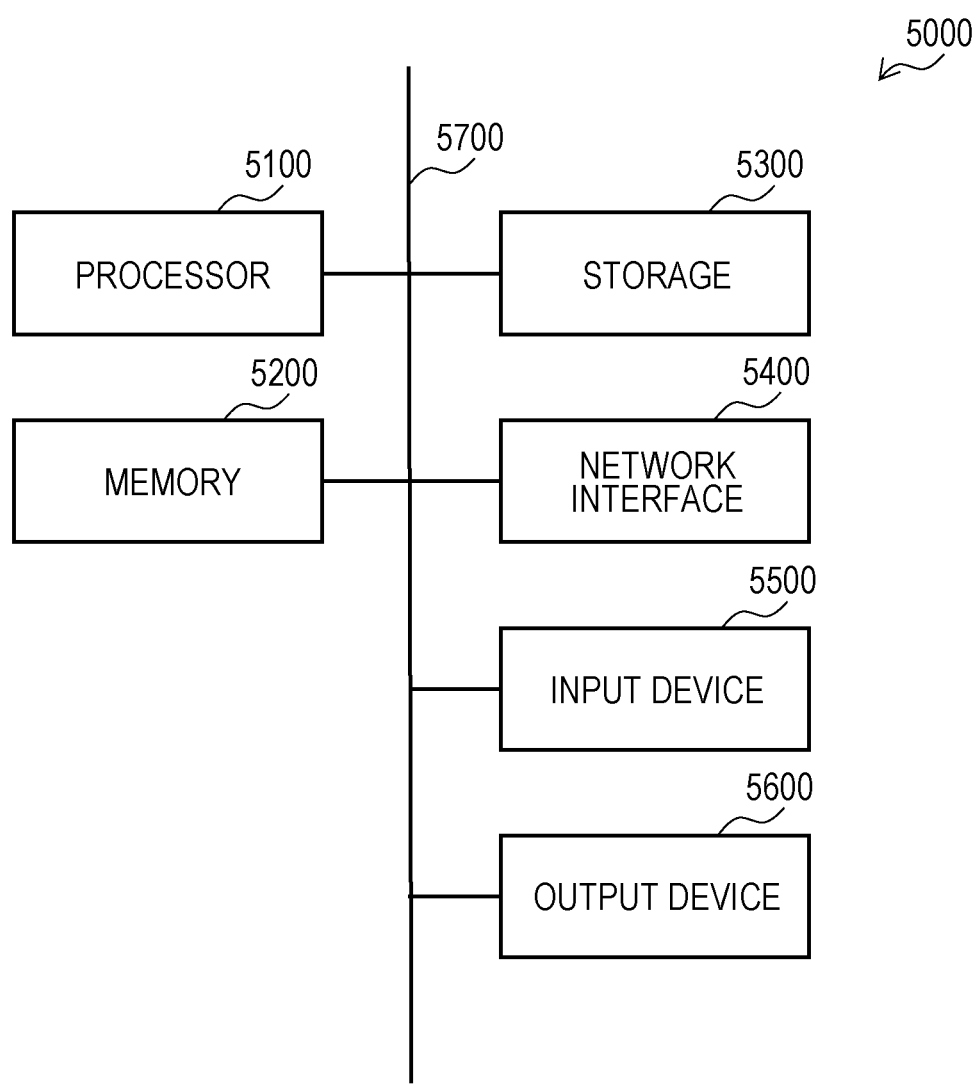
FIG. 22 is a diagram illustrating an example of computer hardware that realizes an API selection system.

FIG. 22 is a diagram illustrating an example of computer hardware that realizes the API selection system S. In a computer 5000, a processor 5100, a memory 5200, a storage 5300, a network interface 5400, an input device 5500, and an output device 5600 are connected via a bus 5700. The processor 5100 is a CPU (Central Processing Unit) or the like. The memory 5200 is a RAM (Random Access Memory) or the like. The storage 5300 is an HDD (Hard Disk Drive), an SSD (Solid State Drive), a medium reader, or the like. The input device 5500 is a keyboard, a mouse, a touch panel, or the like. The output device 5600 is a display or the like.

In the computer 5000, a program for realizing the API selection system S is read from the storage 5300 and executed in cooperation with the processor 5100 and the memory 5200, so that the API selection system S is realized. Alternatively, the program for realizing the API selection system S may be acquired from an external computer by communication via the network interface 5400. Alternatively, programs for realizing the application management server 11 and the API management server 21 each may be recorded on a portable recording medium (optical disk, semiconductor storage medium, etc.) and read by a medium reader to be executed in cooperation with the processor 5100 and the memory 5200.

Note that each of the application management server 11, the application resource database 12, the API management server 21, the API repository 22, the application execution environment 3, and the API execution environment 4 may be realized on one computer 5000, or each functional unit may be realized by being appropriately distributed and arranged on a plurality of computers 5000. Further, the application resource database 12, the API management server 21, the API repository 22, the application execution environment 3, and the API execution environment 4 may be constructed in a cloud or on-premises.

Further, the invention is not limited to the above embodiments, and various modifications can be made. For example, the above-described embodiments of the invention have been described in detail in a clearly understandable way, and are not necessarily limited to those having all the described configurations. In addition, as long as there is no contradiction, some of the configurations of a certain embodiment may be replaced with the configurations of the other embodiments, and the configurations of the other embodiments may be added to the configurations of the subject embodiment. In addition, some of the configurations of each embodiment may be added, omitted, replaced, integrated, or distributed. Further, the configurations and processes illustrated in the embodiments can be appropriately distributed, integrated, or replaced based on the processing efficiency or the mounting efficiency.

What is claimed is:

1. An API (Application Programming Interface) selection system that selects an API, comprising:
    an API repository that accumulates an API in association with a functional requirement of the API;
    a processor coupled to a memory storing instructions that, when executed by the processor, configure the processor to:
    receive, from an application developer, an input of an API request definition that defines the functional requirement and a non-functional requirement required for an API with which an application developed by the application developer is linked and saves the input in a storage unit;
    execute a candidate API extraction process of extracting, from the API repository, a plurality of candidate APIs having a functional requirement which matches or is similar to the functional requirement of the API request definition saved in the storage unit;
    perform a release test process in which a traffic is increased in all APIs included in the candidate APIs from which the API determined not to satisfy the performance requirement is excluded to measure a performance of the API, and an API having a best measured value is uniquely determined,
    wherein the API request definition includes:
    an address of the API repository that saves an API to be searched,
    a keyword, as the functional requirement, for searching for an input/output format of data of an API and the API, and
    an API performance requirement and a release method as the non-functional requirement, and
    wherein, in executing the candidate API extraction process, an API that is associated with an input/output format and a word which match or are similar to the input/output format and the keyword described in the API request definition is extracted from among the APIs saved in the API repository of the address.

2. The API selection system according to claim 1, wherein the processor is further configured to:
    execute a deploy process of deploying the application, an API gateway, and the plurality of candidate APIs in an execution environment; and
    perform an operation test of an application by linking the application and the candidate APIs via the API gateway, determine whether an observed value of a performance of the application linked with an API satisfies the performance requirement, and execute an operation test process of excluding an API determined not to satisfy the performance requirement from the candidate APIs.

3. The API selection system according to claim 2, wherein the processor is further configured to execute the release test process for the application deployed in the execution environment and the API following the operation test process.

4. The API selection system according to claim 2, wherein the processor is further configured to:
    monitor the following conditions (a), (b), and (c) periodically, and
    re-execute the candidate API extraction process, the deploy process, the operation test process, and the release test process when detecting that any one of the following conditions (a), (b), and (c) is met:
    (a) an observed value of the performance of the application deployed in the execution environment no longer meets the performance requirement;
    (b) an API has been newly registered, updated with information, or deleted in the API repository; and
    (c) in the storage unit, the API request definition has been newly registered, updated with information, or deleted.

5. An API (Application Programming Interface) selection method executed by an API selection system that selects an API,
    wherein the API selection system executes:
    a save process of receiving, from an application developer, an input of an API request definition that defines a functional requirement and a non-functional requirement required for an API with which an application developed by the application developer is linked, and saving the input in a storage unit, and
    a candidate API extraction process of extracting, from an API repository that accumulates an API in association with the functional requirement of the API, a plurality of candidate APIs having a functional requirement which matches or is similar to the functional requirement of the API request definition saved in the storage unit by the save process; and
    an application release test process of performing a release test process in which a traffic is increased in all APIs included in the candidate APIs from which the API determined not to satisfy the performance requirement is excluded to measure a performance of the API, and an API having a best measured value is uniquely determined,
    wherein the API request definition includes:
    an address of the API repository that saves an API to be searched,
    a keyword, as the functional requirement, for searching for an input/output format of data of an API and the API, and
    an API performance requirement and a release method as the non-functional requirement, and
    wherein, in the candidate API extraction process, an API that is associated with an input/output format and a word which match or are similar to the input/output format and the keyword described in the API request definition is extracted from among the APIs saved in the API repository of the address.

* * * * *